United States Patent
Recck et al.

(10) Patent No.: US 11,775,907 B1
(45) Date of Patent: Oct. 3, 2023

(54) METHOD FACILITATING BUSINESS CONTINUITY OF ENTERPRISE COMPUTER NETWORK AND SYSTEM ASSOCIATED THEREWITH

(71) Applicant: DATTO, INC., Norwalk, CT (US)

(72) Inventors: Marcus Anthony Recck, Ridgefield, CT (US); Arun Abraham Philip, Norwlk, CT (US)

(73) Assignee: DATTO, INC., Norwalk, CT (US)

( * ) Notice: Subject to any disclaimer, the term of this patent is extended or adjusted under 35 U.S.C. 154(b) by 45 days.

(21) Appl. No.: 17/409,170

(22) Filed: Aug. 23, 2021

(51) Int. Cl.
*G06F 11/00* (2006.01)
*G06Q 10/0637* (2023.01)
(Continued)

(52) U.S. Cl.
CPC ....... *G06Q 10/0637* (2013.01); *G06F 9/3861* (2013.01); *G06F 9/455* (2013.01);
(Continued)

(58) Field of Classification Search
CPC ............ G06F 11/0703; G06F 11/0706; G06F 11/0709; G06F 11/0712; G06F 11/0751; G06F 11/0766; G06F 11/0772; G06F 11/0793; G06F 11/2247; G06F 11/2289; G06F 11/26; G06F 11/261; G06F 11/3003; G06F 11/301; G06F 9/3861; G06F 9/44; G06F 9/455; G06F 9/45504; G06F 9/45508; G06F 9/45533; G06F 9/45558;
(Continued)

(56) References Cited

U.S. PATENT DOCUMENTS 8,392,378 B2 * 3/2013 Pafumi ............... G06F 11/1658
707/831
9,396,052 B2 * 7/2016 Sampath ............... H04L 41/145
(Continued)

OTHER PUBLICATIONS

L. Tomás et al., "Disaster Recovery Layer for Distributed OpenStack Deployments," in IEEE Transactions on Cloud Computing, vol. 8, No. 1, pp. 112-123, Jan. 1-Mar. 2020, doi: 10.1109/TCC.2017.2745560. (Year: 2020).*

(Continued)

*Primary Examiner* — Anthony J Amoroso
(74) *Attorney, Agent, or Firm* — MASCHOFF BRENNAN

(57) ABSTRACT

A method facilitating business continuity of an enterprise computer network includes receiving an initiate network recovery message at a disaster recovery orchestration platform identifying an enterprise computer network to be recovered. Predetermined network configuration information associated with the enterprise computer network is retrieved from a storage device accessible to the disaster recovery orchestration platform. A virtual recovered enterprise network is built in a virtual computing environment based at least in part on the predetermined network configuration information. A system to facilitate business continuity of an enterprise computer network is also provided. The system includes a disaster recovery orchestration platform, a storage device, and at least one communication interface. The disaster recovery orchestration platform including at least one platform computing device. Each platform computing device including at least one processor and associated memory.

23 Claims, 14 Drawing Sheets

(51) Int. Cl.
  *G06Q 10/067* (2023.01)
  *G06F 9/38* (2018.01)
  *G06F 9/455* (2018.01)
  *G06F 11/07* (2006.01)

(52) U.S. Cl.
  CPC ...... *G06F 11/0712* (2013.01); *G06F 11/0793* (2013.01); *G06Q 10/067* (2013.01)

(58) Field of Classification Search
  CPC ............ G06F 2009/45591; G06F 2009/45595; G06Q 10/0637; G06Q 10/067
  See application file for complete search history.

(56) References Cited

U.S. PATENT DOCUMENTS

| | | | | |
|---|---|---|---|---|
| 10,129,373 | B2* | 11/2018 | Firley | H04L 41/0668 |
| 10,146,636 | B1* | 12/2018 | Ghare | G06F 11/3696 |
| 10,210,079 | B2* | 2/2019 | Ray | G06F 11/2041 |
| 10,496,499 | B2* | 12/2019 | Yuen | G06F 11/3419 |
| 11,057,264 | B1* | 7/2021 | Ghare | H04L 41/0654 |
| 2016/0210199 | A1* | 7/2016 | Christensen | G06F 11/1417 |
| 2020/0334061 | A1* | 10/2020 | Zlotnick | G06F 11/1484 |
| 2023/0032790 | A1* | 2/2023 | Mahajan | H04L 63/083 |

OTHER PUBLICATIONS

C. Ward et al., "Toward transforming business continuity services," in IBM Journal of Research and Development, vol. 53, No. 6, pp. 7:1-7:15, Nov. 2009, doi: 10.1147/JRD.2009.5429035. (Year: 2009).*
Datto-Unified Continuity; Alto 3; Nov. 2020, 2 pages.
Datto-Business Management; Datto RMM; Dec. 2020, 2 pages.
Datto-Unified Continuity; Siris: Siris Business Continuity and Disaster Recovery; Mar. 24, 2021, 4 pages.
Datto-Unified Continuity; vSiris: Siris Business Continuity and Disaster Recovery Deployed as a Virtual Appliance; Mar. 12, 2021, 4 pages.
Datto-Unified Continuity; The Datto Cloud: The Purpose-Built Backup & Recovery Cloud; Mar. 12, 2021, 3 pages.
Datto; The Datto Cloud: The purpose-built Backup and Recovery Cloud; Jan. 2021, 2 pages.
Datto-Unified Continuity; The Datto Cloud-Specifications: The Purpose-Built Backup & Recovery Cloud; 2021, 2 pages.
Datto-Unified Continuity; Datto Cloud Continuity for PC's; Jul. 2020, 2 pages.
Ubiquiti Inc.; UniFi-USG Advanced Configuration Using config. gateway.json; printed from help.ui.com/hc/en-us/articles/215458888 on Jul. 23, 2021; pp. 1-11.
Jessie Reed; Automatic Failover and VM Disaster Recovery Automation; Dec. 13, 2018; pp. 1-20.
Druva; Create a DR plan; Aug. 9, 2021; pp. 1-12.
Microsoft Azure; Manage VM network interfaces for on-premises disaster recovery to Azure; Apr. 9, 2019; pp. 1-3.
Nakivo; Setting Up a Dedicated Backup Network; Sep. 27, 2019; pp. 1-3.
Veeam Availability Orchestrator 4.0; User Guide: Managing Recovery Locations; Step 6. Configure Re-IP Rules; Step 7. Configure Network Mapping; Jan. 20, 2021; 6 pages.
Veeam; Veeam Availability Orchestrator/Deployment Guide; Mar. 2021; Version 4.0; pp. 1-84.
Veeam; Veeam Disaster Recovery Orchestrator/ 1-click site recovery and DR testing; printed from www.veeam.com/disaster-recovery-orchestrator.html on Jul. 26, 2021; pp. 1-8.
Veeam; Veeam Disaster Recovery Orchestrator/ 1-click site recovery and DR testing; Mar. 19, 2021, 2 pages.
NMAP (1)—Linux Man Page; nmap—Network exploration tool and security /port scanner; printed from linux.die.net/man/1/nmap on Jul. 26, 2021, pp. 1-56.

* cited by examiner

METHOD FACILITATING BUSINESS CONTINUITY OF ENTERPRISE COMPUTER NETWORK AND SYSTEM ASSOCIATED THEREWITH

BACKGROUND

The present exemplary embodiment relates to a method that facilitates business continuity of an enterprise computer network and a system that implements the method. The method builds a virtual recovered enterprise network in a virtual computing environment based on predetermined network configuration information for the enterprise computer network. In various embodiments, the virtual recovered enterprise network includes virtual machines and/or virtual machine mocks in any suitable combination. The virtual machines and virtual machine mocks are based on predetermined asset configuration information for protected network assets of the enterprise computer network. The method and system find application in full scale and partial disaster recovery scenarios and are described in reference thereto. In this application, business continuity of the enterprise computer network is provided. It is understood that certain embodiments of the method and system relate to other applications, such as disaster recovery testing; development and/or testing of upgrades to current network assets; testing and/or integration of alpha and/or beta versions of new network assets; and development, testing, and/or integration of new assets into the network.

Most businesses use an enterprise computer network to maintain records and manage business operations. Enterprise computer networks include information technology (IT) systems and services that are installed, monitored, and maintained by IT specialists. Businesses may employ IT specialists or contract with outside firms that provide IT equipment, software, and services. Businesses with complex enterprise computer networks use some combination of employees and outside firms. Outside firms that provide such IT services may be referred to as IT managed service providers (MSPs). The business is a customer or client of the IT MSP. Mid-level IT MSPs specialize in providing day-to-day services directly to its customers and may partner with top-level IT MSPs that develop and support certain IT products and services. The mid-level IS MSP is a customer or partner of the top-level IT MSP.

IT MSP products and services available to businesses that prevent data loss and minimize downtime of enterprise computer networks are referred to as business continuity and disaster recovery (BCDR) products and services. In a true disaster scenario, creating the necessary network configurations during a moment of panic is both cumbersome and error prone. A partner's network may have many small details that could get overlooked very easily while in the process of remediation for their customer. An MSP may provide a virtualized network service to its client. However, all the settings for an MSP's virtualized network are manually configured, piece by piece. Moreover, the timeline of reusability for the configuration settings is only 72 hours from the last use of the network.

For example, a partner may give the network configuration details to a top-level IT MSP that provides cloud-based services. The top-level IT MSP may create the virtualized network and provide the cloud service to the partner based on those details. However, this only moves the pressure associated with a disaster scenario to the top-level IT MSP and assumes the network configuration details handed off from the partner are correct.

Existing disaster recovery products face various drawbacks. For example, products that require network configuration settings to be determined prior to the disaster may not be accurate at the time of the disaster. Conversely, products that determine network configuration settings after the disaster are not fully automated and cause delays in accomplishing recovery of the protected enterprise computer network to a DR network. Thus, it is desirable to provide an improved disaster recovery solution without the drawbacks mentioned above.

BRIEF DESCRIPTION

In one aspect, a method facilitating business continuity of an enterprise computer network is provided. In one embodiment the method includes receiving an initiate network recovery message at a disaster recovery orchestration platform identifying an enterprise computer network to be recovered, the disaster recovery orchestration platform including at least one platform computing device, each platform computing device including at least one processor and associated memory; retrieving predetermined network configuration information associated with the enterprise computer network from a storage device accessible to the disaster recovery orchestration platform; and building a virtual recovered enterprise network in a virtual computing environment based at least in part on the predetermined network configuration information.

In another aspect, a system to facilitate business continuity of an enterprise computer network is provided. In one embodiment, the system includes a disaster recovery orchestration platform, a storage device, and at least one communication interface. The disaster recovery orchestration platform configured to control and manage virtualization and recovery of an enterprise computer network. The disaster recovery orchestration platform including at least one platform computing device. Each platform computing device including at least one processor and associated memory. The storage device in operative communication with the disaster recovery orchestration platform and configured to store predetermined network configuration information associated with the enterprise computer network. The at least one communication interface in operative communication with the disaster recovery orchestration platform. The disaster recovery orchestration platform is configured to receive an initiate network recovery message via the at least one communication interface. The initiate network recovery message identifying an enterprise computer network to be recovered. The disaster recovery orchestration platform is configured to retrieve the predetermined network configuration information from the storage device. The disaster recovery orchestration platform is configured to build a virtual recovered enterprise network in a virtual computing environment based at least in part on the predetermined network configuration information.

In yet another aspect, a non-transitory computer-readable medium storing program instructions is provided. The program instruction, when executed by at least one platform computing device or at least one processor, cause a computer-controlled orchestration platform to perform a method facilitating business continuity of an enterprise computer network. In one embodiment, the method including receiving an initiate network recovery message at a disaster recovery orchestration platform identifying an enterprise computer network to be recovered; retrieving predetermined network configuration information associated with the enterprise computer network from a storage device accessible to the disaster recovery orchestration platform; and building a virtual recovered enterprise network in a virtual computing environment based at least in part on the predetermined network configuration information.

DETAILED DESCRIPTION

Figure 1:
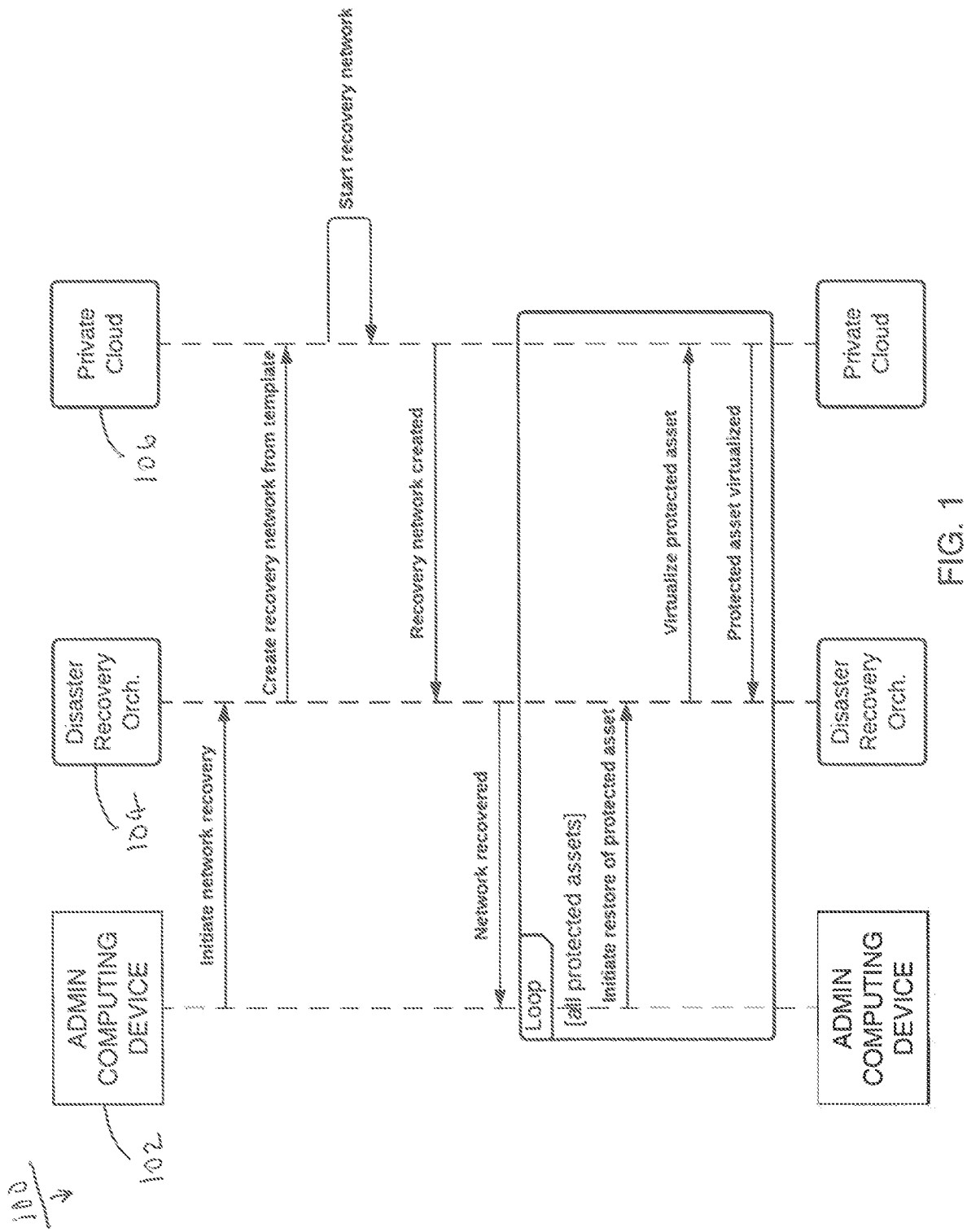
FIG. 1 is a functional diagram showing an exemplary embodiment of a network recovery process associated with a system facilitating business continuity of the enterprise computer network.

Provided in various embodiments are methods and systems that facilitate business continuity of an enterprise computer network. The various embodiments disclosed herein enable a virtual recovered enterprise network to be built in a virtual computing environment based on predetermined network configuration information for the enterprise computer network. In a disaster recovery scenario, the virtual recovered enterprise network is built after the disaster (e.g., a critical failure of a protected asset in the enterprise computer network or the entire network). The predetermined network configuration information may be determined after detection of the disaster based on any suitable combination of configuration information recorded during installation, maintenance, monitoring, and/or backup processes associated with the enterprise computer network and its protected assets.

One advantage of the methods and systems disclosed herein is that, before a disaster recovery, a mid-level IT MSP (e.g., partner) can configure a template that represents a condensed form of a network topology for an enterprise computer network used by its customer (e.g., client). This includes basic networking information, such as network space and Internet functionality, DHCP ranges, DHCP reservations, port forwards, IPSec tunnels, and predetermined client VPN connections.

The template can be an electronic file. For example, the template file can in a JavaScript object notation (JSON) file format and can include a binary large object (BLOB). The template can also include schema for the enterprise computer network and protected network assets. An example of a template in a JSON file format is provided below:

```
{
    "baseIp": "192.168.0.0",
    "subnetMask": "255.255.255.0",
    "gateway": "192.168.0.1",
    "internetEnabled": true,
    "dhcpConfigurations": [
        {
            "dhcpStart": "192.168.0.2",
            "dhcpEnd": "192.168.0.255",
            "dhcpReservations": [
                {
                    "localIp": "192.168.0.10",
                    "macAddress": "ab:cd:ef:01:23:45",
                    "portFowards": [
                        {
                            "portStart": 22,
                            "portEnd": 22,
                            "allowTcp": true,
                            "allowUdp": true
                        }
                    ]
                }
            ]
        }
    ],
    "ipsecConfigurations": [
        {
            "protocol": "ikev2",
            "remoteId": "10.0.21.50",
            "remoteIp": "10.0.21.50",
            "phase1": {
                "encryptionAlgo": "blowfish256",
                "hashAlgo": "md5",
```

-continued

```
        "dhGroup": "modp2048",
        "lifetime": 86400
      },
      "phase2": {
        "encryptionAlgo": "blowfish256",
        "hashAlgo": "md5",
        "dhGroup": "modp2048",
        "lifetime": 86400
      },
      "deadPeer": {
        "enabled": true,
        "timeout": 30
      },
      "dynamicPhase2": true,
      "remoteSubnets": [
        "192.168.50.0/24"
      ]
    }
  ]
}
```

The various embodiments of methods and systems disclosed herein allow a top-level IT MSP (e.g., Datto) to extrapolate a network topology and translate the individual network configurations into reusable components that are automatically duplicated in a cloud provided by the top-level IT MSP. This allows for a virtualized network in the cloud that mimics or closely resembles the actual network a business (e.g., customer, client, enterprise, etc.) uses on-premises. This automates that portion of disaster recovery by allowing partners (e.g., mid-level IT MSPs) one click solutions to virtualizing the network of their customer for use in disaster recovery. This uses a combination of existing and new functionality for both extrapolation of the network topology and virtualization of the network in the cloud. For example, the techniques disclosed herein provide an automated replacement for an existing piecewise process to determine configuration settings for the enterprise computer network that allows for reusability at a moment's notice.

By providing the tools for a partner to automatically configure this template, the methods and systems disclosed herein remove a very complicated and potentially time-consuming piece from the traditional disaster recovery process. Instead of needing to create all network configuration settings at the time of recovery, certain embodiments of methods and systems disclosed herein offer the partner a single-click option to restore their network in the cloud based on the options defined in the template.

This paragraph provides definitions and/or examples of certain terms and phrases used herein. The definitions and examples provided below are considered non-limiting and supplemental with respect to descriptions of the corresponding terms and phrases provided throughout this disclosure. Likewise, the definitions and examples provided below are considered non-limiting and supplemental with respect to common definitions known in the applicable art and common dictionary definitions.

IT Administrator—a person responsible for administering systems and their recovery during disaster.

Disaster Recovery Orchestration—a web-based orchestration platform that assists in system recovery.

RMM Tool—a remote monitoring and management tool for protected systems.

On-Premises BDR Appliance—a physical or virtual appliance that exists within a customer's infrastructure to facilitate backup and local recovery for a customer's protected assets.

Private Cloud—an environment to which a customer's data is replicated from which such data can be recovered.

With reference to FIG. 1, a functional diagram shows an exemplary embodiment of a network recovery process associated with a system 100 facilitating business continuity of an enterprise computer network (not shown). In this embodiment, the system 100 includes an administrator computing device 102 for an IT administrator, a disaster recovery orchestration 104, and a private cloud 106 for a recovery network. During a disaster or during a disaster recovery test, an IT administrator would be able to initiate network recovery from the administrator computing device 102 with a single click. Once initiated, the disaster recovery orchestration 104 will use a stored template that was obtained from a network discovery process and reach out to the private cloud 106 to create the network configurations identified in the template. After the network configurations are created in the private cloud 106, the network is deemed recovered. Next, the IT administrator would proceed to recover some or all the protected assets in the private cloud with the recovered network. If this was a disaster recovery test and certain protected assets were unable to recovered (e.g., due to conflicts with production-facing resources or licensing constraints), the IT administrator can perform a verification on the remaining assets with the recovered network using provisioned mock systems.

Figure 2:
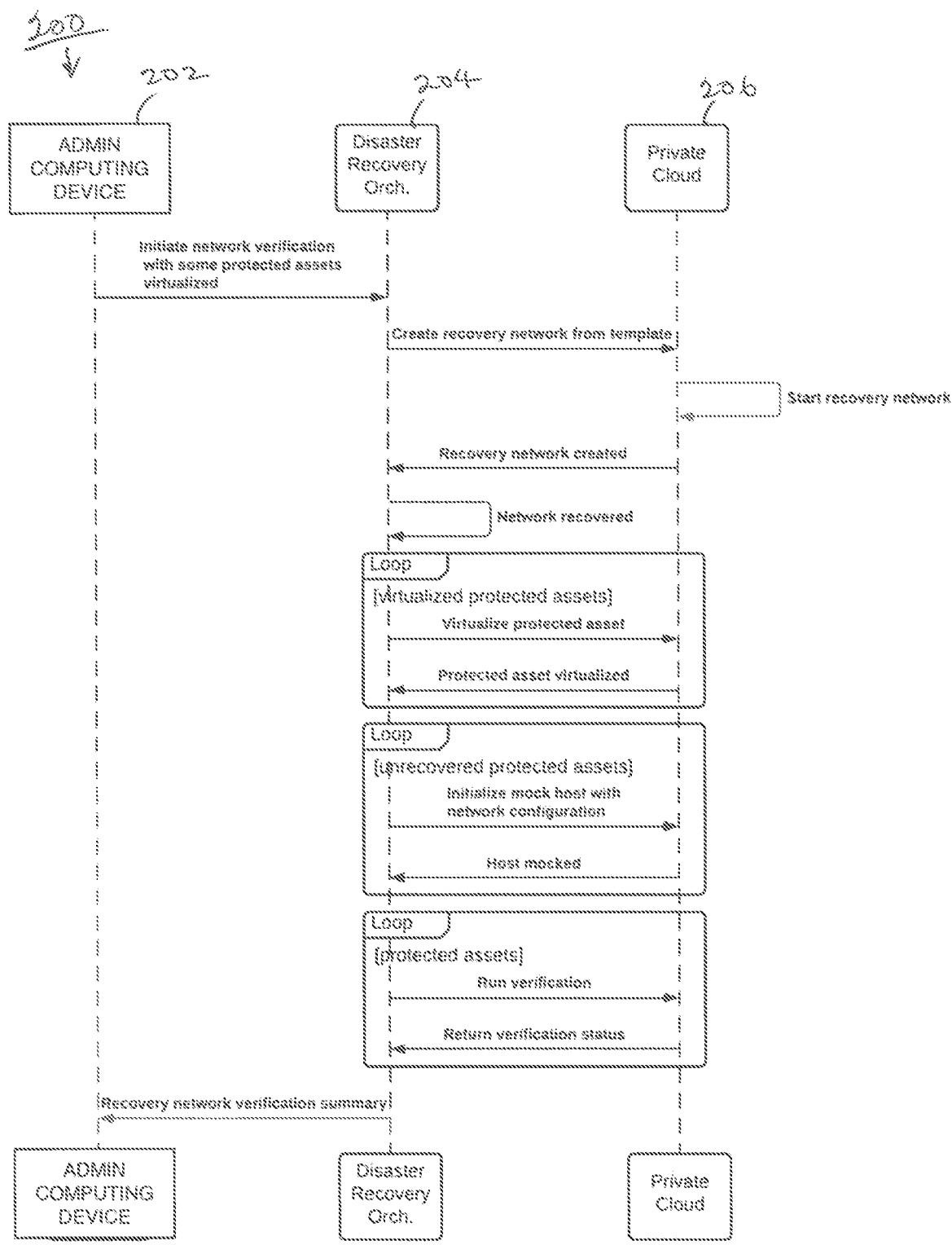
FIG. 2 is a functional diagram showing an exemplary embodiment of a network recovery and verification process associated with a system facilitating business continuity of the enterprise computer network.

With reference to FIG. 2, a functional diagram shows an exemplary embodiment of a network recovery and verification process associated with a system 200 facilitating business continuity of an enterprise computer network (not shown). In this embodiment, the system 200 includes an administrator computing device 202 for an IT administrator, a disaster recovery orchestration 204, and a private cloud 206 for a recovery network. A network verification process can be achieved by provisioning mock hosts on a given disaster recovery network using the same networking configurations as the stored template described for the network recovery process. The mock hosts are used to determine what an expected topology would look like during a disaster recovery without needing to stand up a full disaster recovery test.

Figure 3:
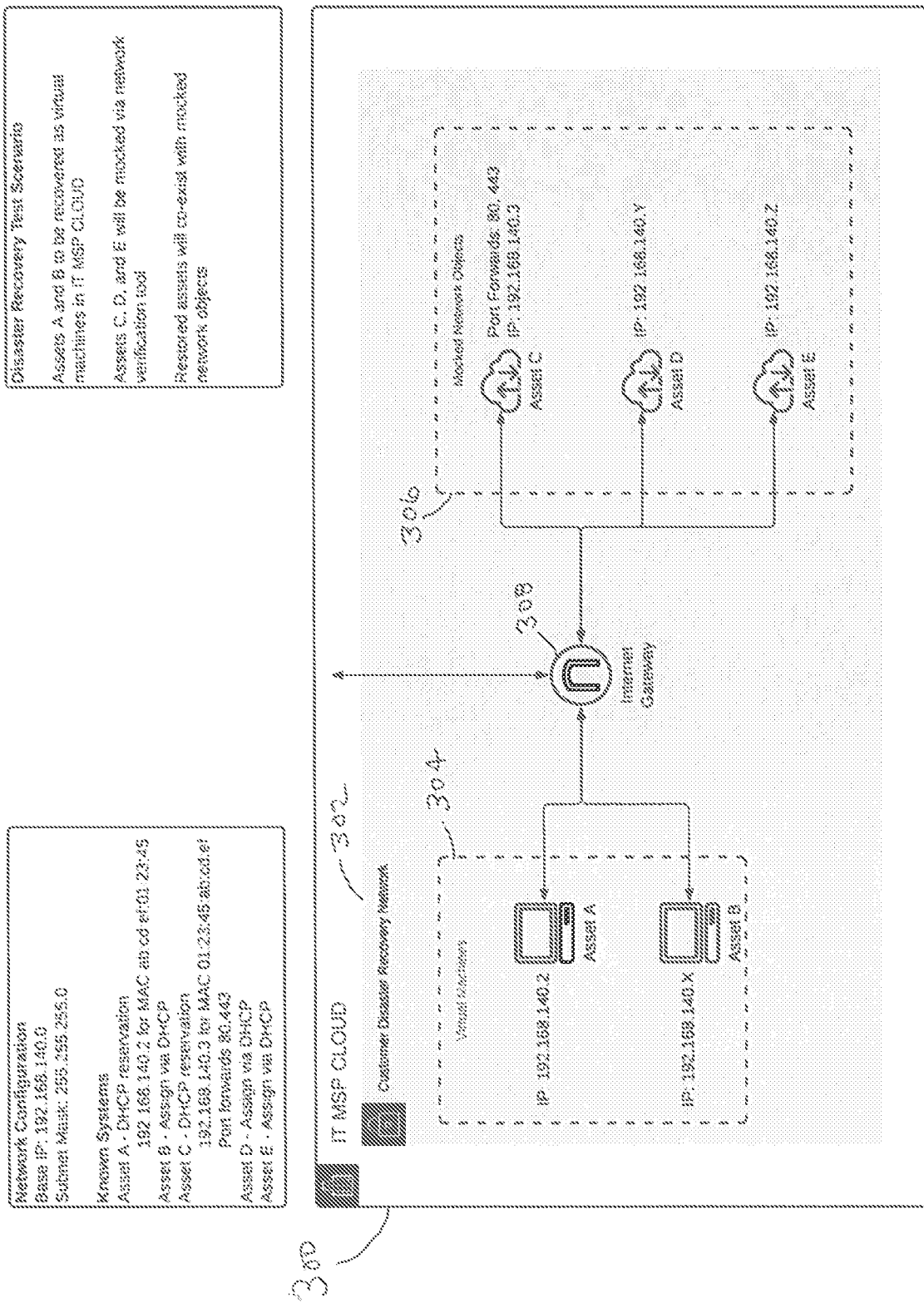
FIG. 3 is a functional diagram showing an exemplary embodiment of a network discovery process associated with a system facilitating business continuity of the enterprise computer network.

With reference to FIG. 3, a block diagram shows an exemplary embodiment of an IT MSP cloud 300 associated with a system facilitating business continuity of an enterprise computer network (not shown). In this embodiment, the IT MSP cloud 300 includes a customer disaster recovery network 302 with a group of virtual machines 304, a group of mocked network objects 306, and an Internet gateway 308.

FIGS. 2 and 3 show how recovered systems can be used in tandem with provisioned mock systems. This allows for partial mocking of the network topology to provide a way for the systems to communicate as if they were on the same network. Mocking hosts on the given disaster recovery network can be achieved by creating a mock client (using network namespaces), attaching the mock client to the given disaster recovery network (using virtual Ethernet devices, or VETHs), and invoking commands within the given mock client (e.g., netcat) to mimic the given host which we are mocking.

Figure 4:
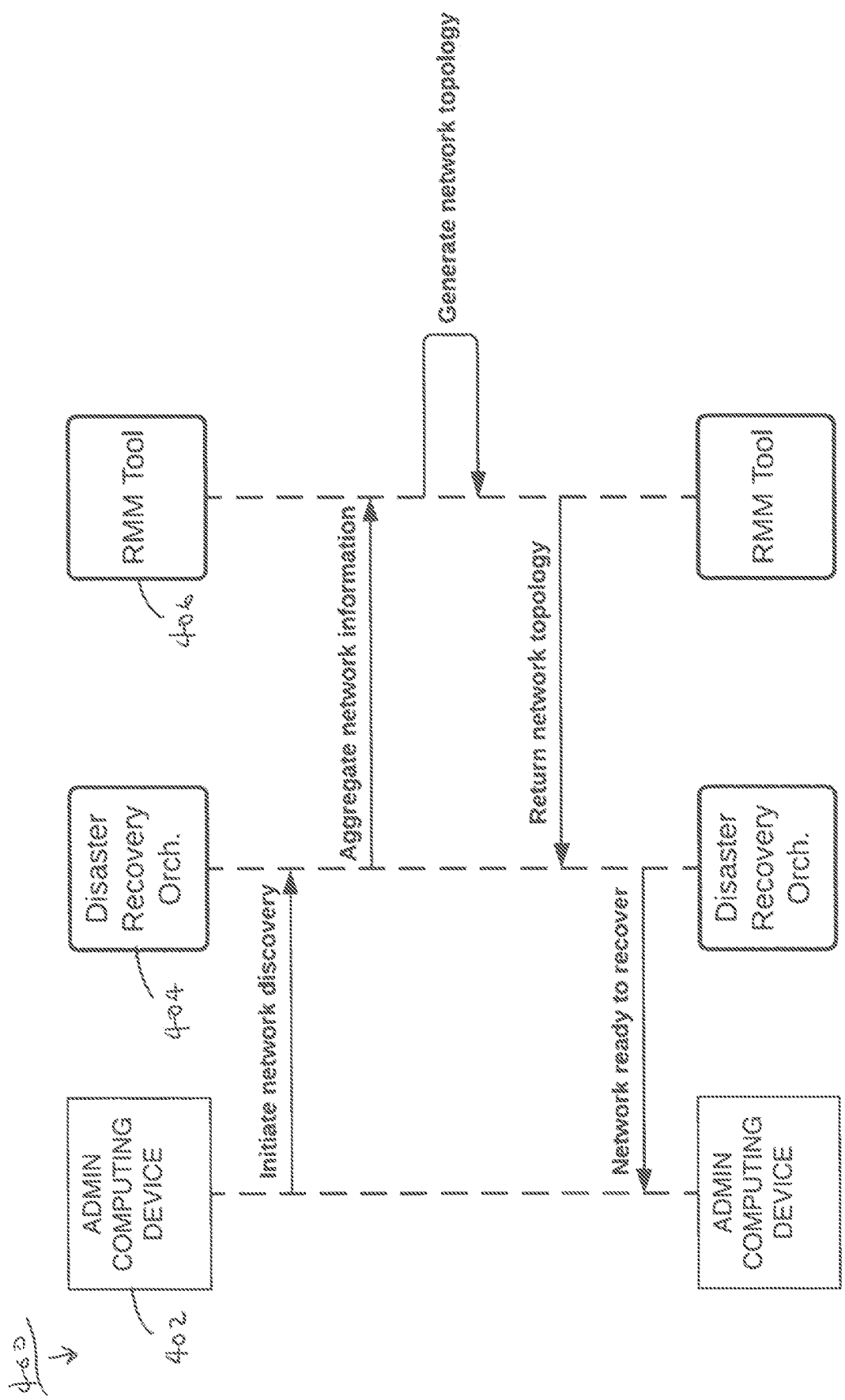
FIG. 4 is a functional diagram showing another exemplary embodiment of a network discovery process associated with a system facilitating business continuity of the enterprise computer network.

With reference to FIG. 4, a functional diagram shows an exemplary embodiment of a network discovery process associated with a system 400 facilitating business continuity of an enterprise computer network (not shown). In this embodiment, the system 400 includes an administrator computing device 402 for an IT administrator, a disaster recovery orchestration 404, and an RMM tool 406 associated with the enterprise computer network. Before a disaster, an IT administrator can use the administrator computing device 402 to initiate an automated network discovery in conjunction with the RMM tool 406. The RMM tool 406 is used to save the networking configuration as a template for use in a future recovery scenario. This stored template can be used to avoid manually re-configuring the network during the disaster.

Figure 5:
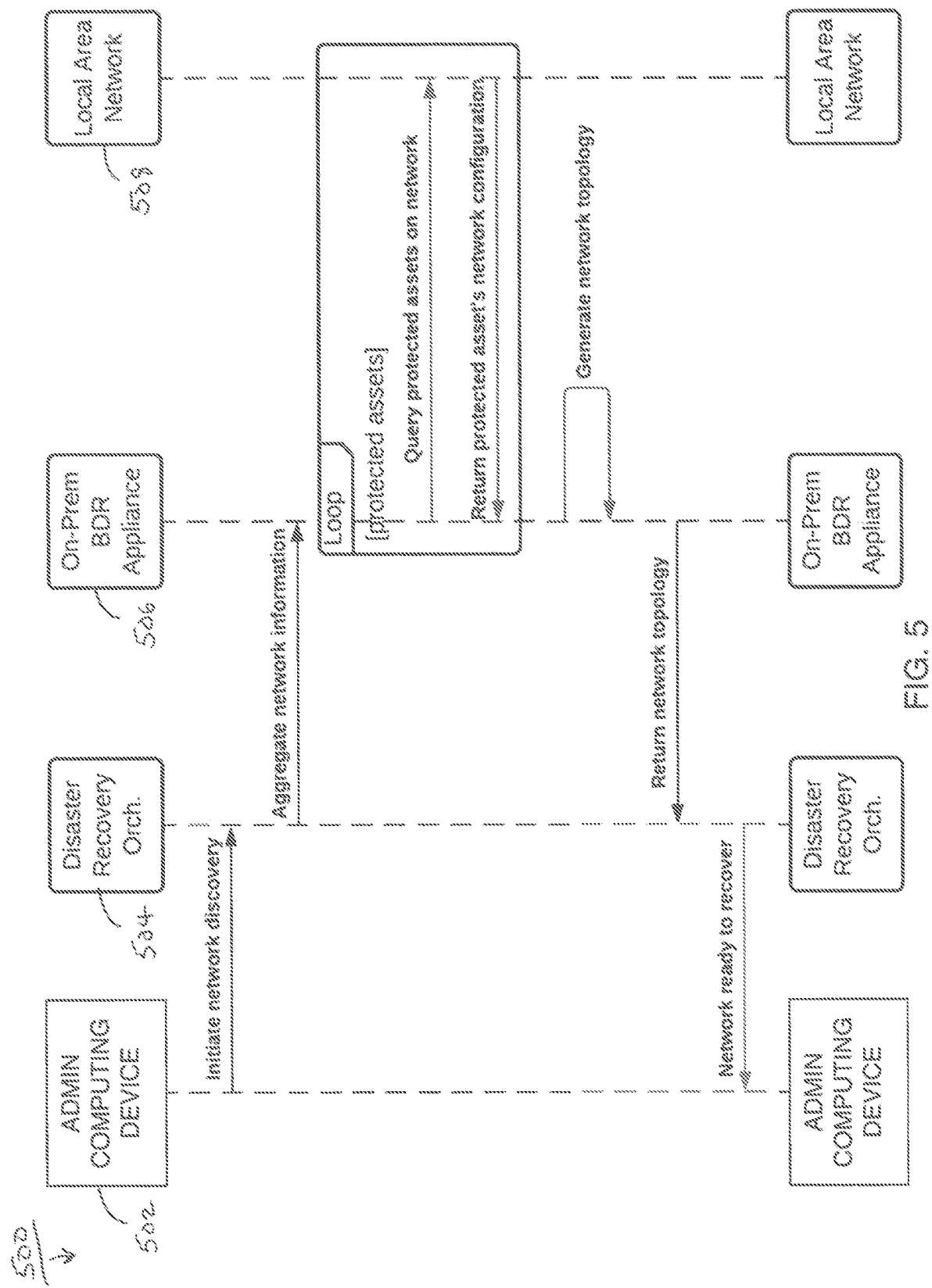
FIG. 5 is a functional diagram showing yet another exemplary embodiment of a network discovery process associated with a system facilitating business continuity of the enterprise computer network.

With reference to FIG. 5, a functional diagram shows another exemplary embodiment of a network discovery process associated with a system 500 facilitating business continuity of an enterprise computer network (not shown). In this embodiment, the system 500 includes an administrator computing device 502 for an IT administrator, a disaster recovery orchestration 504, an on-premises BDR appliance 506 associated with the enterprise computer network, and a local area network (LAN) 508 associated with the enterprise computer network. Before a disaster, an IT administrator can use the administrator computing device 502 to initiate an automated network discovery in conjunction with the on-premises BDR appliance 506. The on-premises BDR appliance 506 is used to save the networking configuration as a template for use in a future recovery scenario. This stored template can be used to avoid manually re-configuring the network during the disaster.

Figure 6:
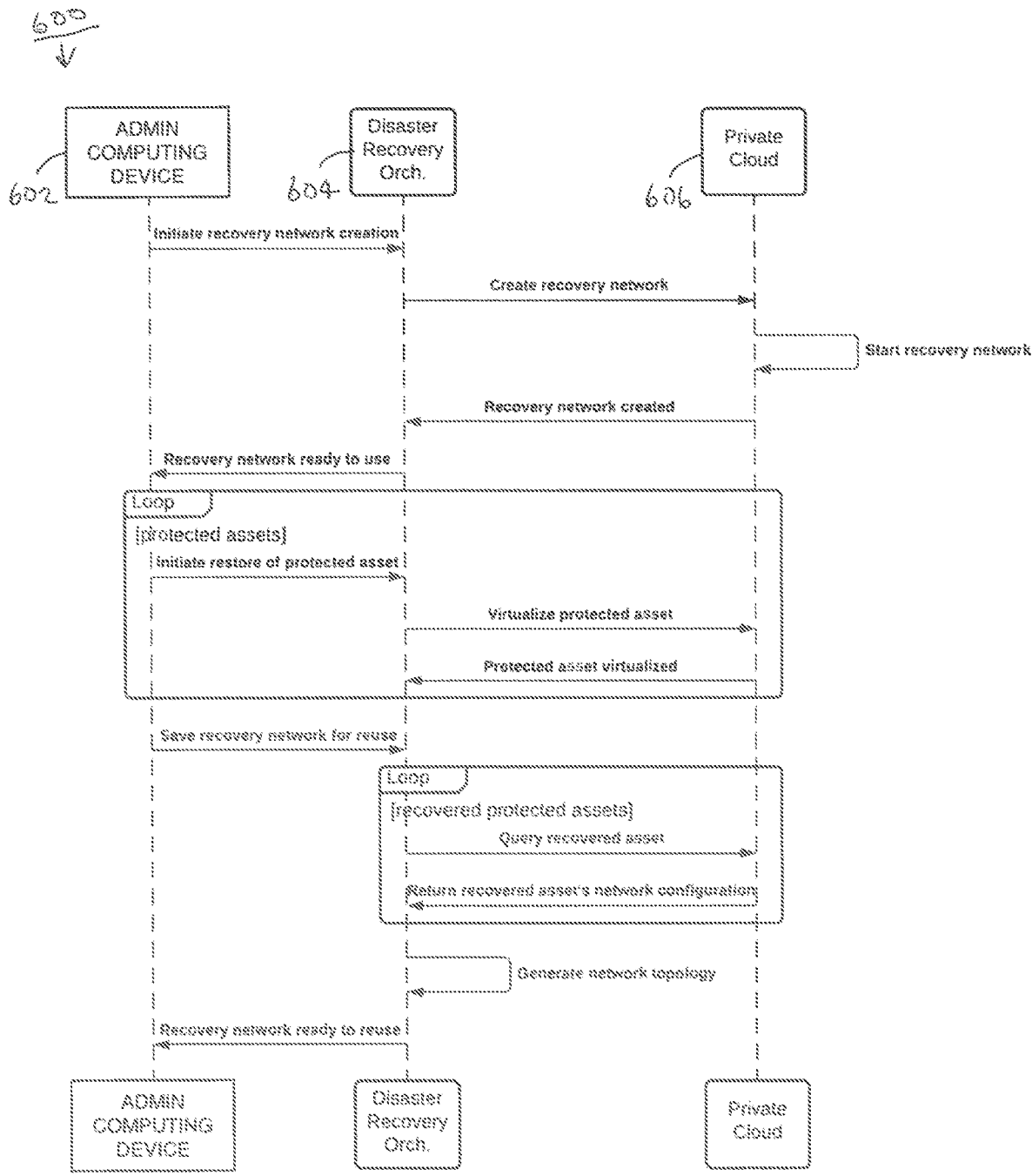
FIG. 6 is a block diagram showing an exemplary embodiment of an IT MSP cloud associated with a system facilitating business continuity of an enterprise computer network.

With reference to FIG. 6, a functional diagram shows yet another exemplary embodiment of a network discovery process associated with a system 600 facilitating business continuity of an enterprise computer network (not shown). In this embodiment, the system 600 includes an administrator computing device 602 for an IT administrator, a disaster recovery orchestration 604, and a private cloud 606 for a recovery network and an enterprise network backup repository. During a disaster without pre-configured networking templates, an IT administrator can use the administrator computing device 602 to create virtual machines from backup versions of protected assets stored in the private cloud 606, apply appropriate network configurations to build the recovery network, and store the active networking configuration for future use. This enables use of the same network configuration in the future without manually re-configuring the network during a next disaster.

Figure 7:
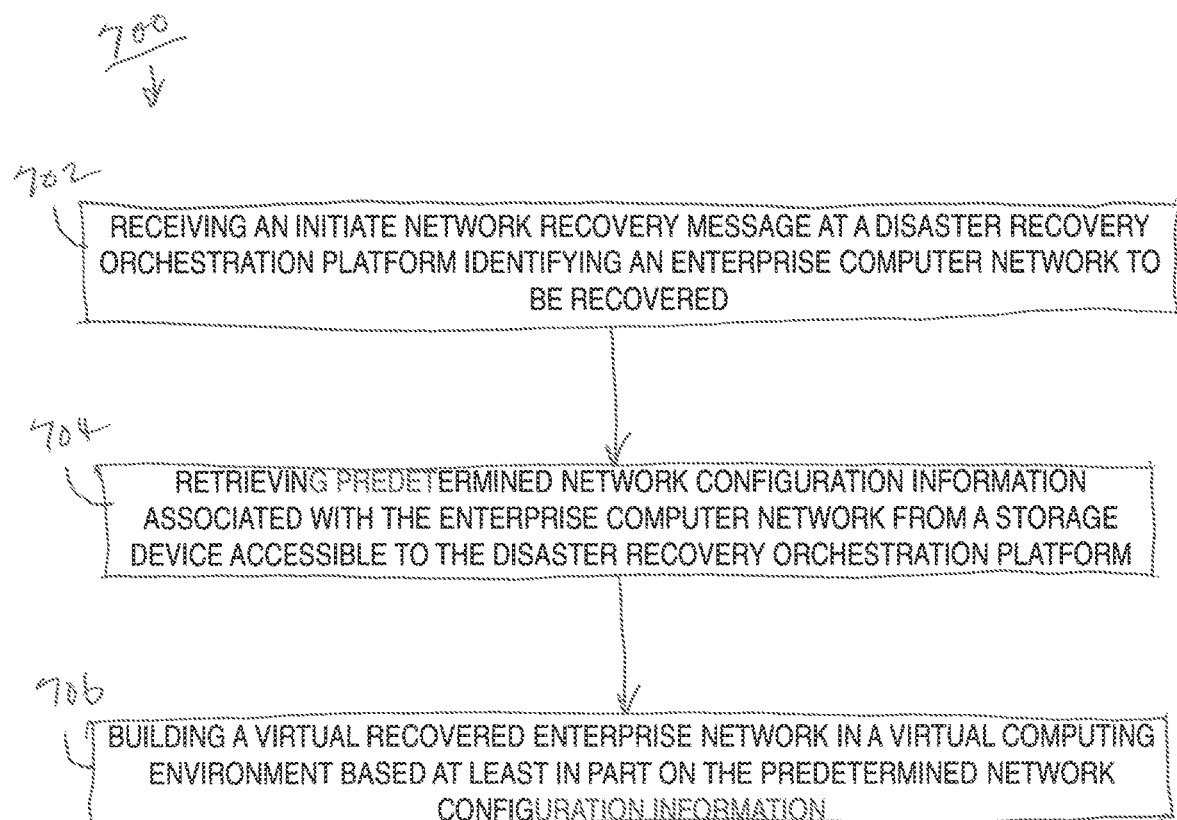
FIG. 7 is a flow chart showing an exemplary embodiment of a process facilitating business continuity of an enterprise computer network.

With reference to FIG. 7, an exemplary embodiment of a process 700 facilitating business continuity of an enterprise computer network begins at 702 where an initiate network recovery message is received at a disaster recovery orchestration platform identifying an enterprise computer network to be recovered. The disaster recovery orchestration platform including at least one platform computing device. Each platform computing device including at least one processor and associated memory. At 704, predetermined network configuration information associated with the enterprise computer network is retrieved from a storage device accessible to the disaster recovery orchestration platform. The predetermined network configuration information includes network topology information, network node information, node interface information, and like information. The predetermined network configuration information also identifies one or more protected network assets. At 706, a virtual recovered enterprise network is built in a virtual computing environment based at least in part on the predetermined network configuration information. The virtual recovered enterprise network mimics at least a portion of the enterprise computer network.

In another embodiment of the process 700, the initiate network recovery message is received from an administrator via an administrator computing device. In yet another embodiment of the process 700, the initiate network recovery message is received from a network monitoring device associated with the enterprise computer network in response to detection of a critical failure of at least one protected network asset of the enterprise computer network. In still another embodiment of the process 700, the enterprise computer network includes a plurality of network assets distributed among multiple physical locations and interconnected via a combination of networks that form a hybrid communication network.

In still yet another embodiment of the process 700, the predetermined network configuration information is arranged in an electronic file. In a further embodiment, the electronic file is in a JavaScript object notation (JSON) file format. In another further embodiment, content of the electronic file includes a binary large object (BLOB). In yet another further embodiment, content of the electronic file includes schema for the enterprise computer network and the one or more protected network assets.

In another embodiment, the enterprise computer network is associated with an organization, the disaster recovery orchestration platform is associated with a mid-level information technology (IT) managed service provider (MSP), and the virtual computing environment is associated with a top-level IT MSP, wherein the organization is a customer of the mid-level IT MSP which is a customer of the top-level IT MSP.

In yet another embodiment, the process 700 also includes sending a network recovered message from the disaster recovery orchestration platform to an administrator associated with the disaster recovery orchestration platform indicating the enterprise computer network was recovered and the virtual recovered enterprise network is available. The network recovered message is accessible to the administrator via an administrator computing device.

In still another embodiment, the process 700 also includes sending a recovery failure message from the disaster recovery orchestration platform to an administrator associated with the disaster recovery orchestration platform indicating at least one of the enterprise computer network was not recovered and the virtual recovered enterprise network is not available. The recovery failure message is accessible to the administrator via an administrator computing device.

Figure 8:
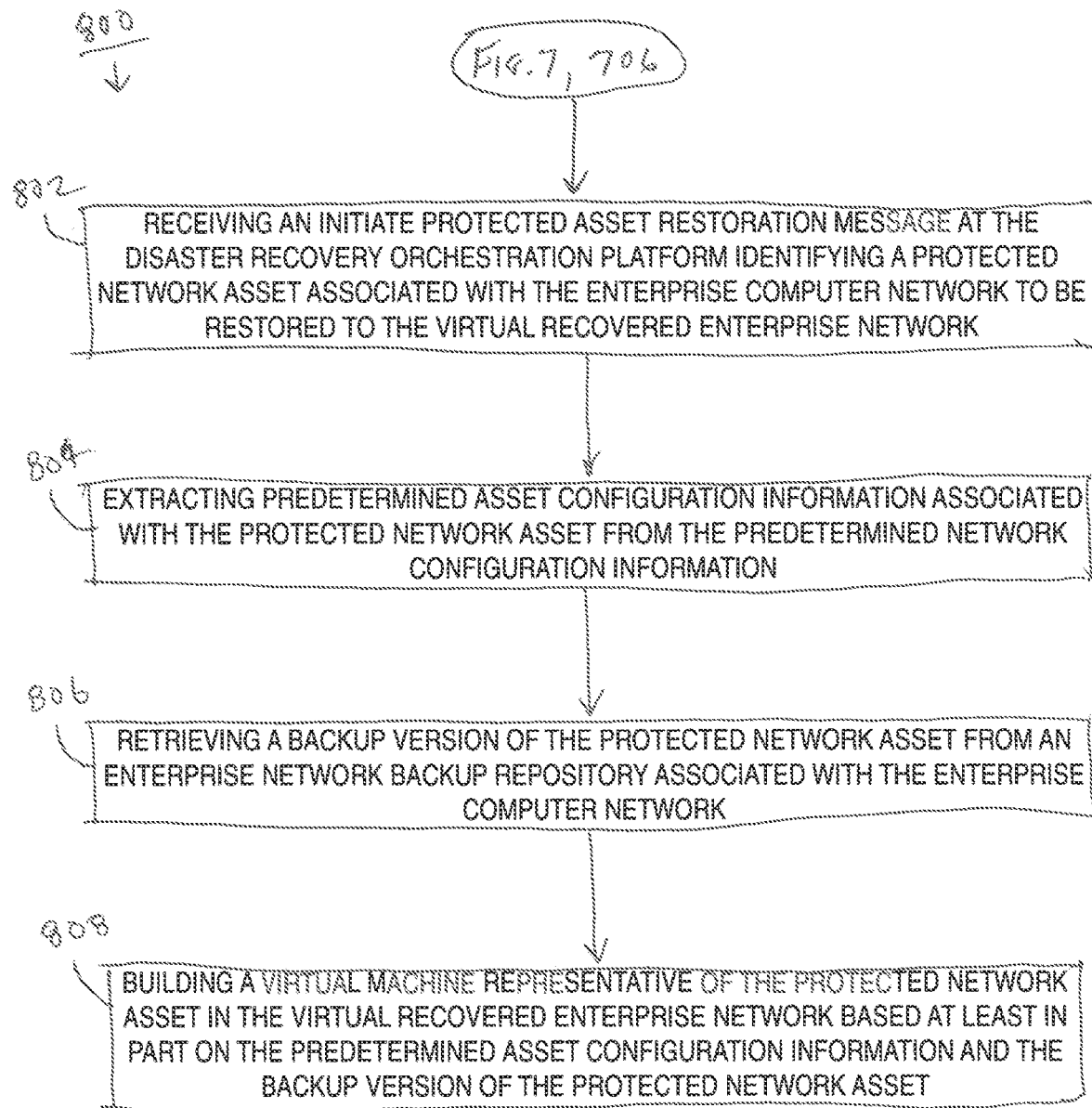
FIG. 8, in combination with FIG. 7, is a flow chart showing another exemplary embodiment of a process facilitating business continuity of an enterprise computer network.

With reference to FIG. 8, another exemplary embodiment of a process 800 facilitating business continuity of an enterprise computer network includes the process 700 of FIG. 7 and continues from 706 to 802 where an initiate protected asset restoration message is received at the disaster recovery orchestration platform identifying a protected network asset associated with the enterprise computer network to be restored to the virtual recovered enterprise network. At 804, predetermined asset configuration information associated with the protected network asset is extracted from the predetermined network configuration information. The predetermined asset configuration information includes asset interface information, asset operating parameters, variable parameter values, fixed parameter values, and the like. At 806, a backup version of the protected network asset is retrieved from an enterprise network backup repository associated with the enterprise computer network. At 808, a virtual machine representative of the protected network asset is built in the virtual recovered enterprise network based at least in part on the predetermined asset configuration information and the backup version of the protected network asset. The virtual machine mimics at least a portion of the protected network asset.

In another embodiment, the process 800 also includes sending an asset restored message from the disaster recovery orchestration platform to an administrator associated with the disaster recovery orchestration platform indicating the protected network asset was restored and the virtual machine is available. The asset restored message is accessible to the administrator via an administrator computing device.

In yet another embodiment, the process 800 also includes sending a restore failure message from the disaster recovery orchestration platform to an administrator associated with the disaster recovery orchestration platform indicating at least one of the protected network asset was not restored and the virtual machine is not available. The restore failure message is accessible to the administrator via an administrator computing device.

In still another embodiment, the process 800 also includes receiving a second initiate protected asset restoration message at the disaster recovery orchestration platform identifying a second protected network asset associated with the enterprise computer network to be restored to the virtual recovered enterprise network. Next, the extracting of the predetermined asset configuration information (804), the retrieving of the backup version (806), and the building of the virtual machine (808) are performed for the second protected network asset identified in the second initiate protected asset restoration message.

In still yet another embodiment of the process 800, the initiate protected asset restoration message identifies multiple protected network assets to be restored to the virtual recovered enterprise network. Next, the extracting of the predetermined asset configuration information (804), the retrieving of the backup version (806), and the building of the virtual machine (808) are performed for each protected network asset identified in the initiate protected asset restoration message. In a further embodiment, the extracting of the predetermined asset configuration information (804), the retrieving of the backup version (806), and the building of the virtual machine (808) for two or more protected network assets identified in the initiate protected asset restoration message are performed in parallel.

In another embodiment, the process 800 also includes selecting the backup version of the protected network asset from a plurality of backup versions of the protected network asset stored in the enterprise network backup repository. In yet another embodiment of the process 800, the enterprise network backup repository is offsite in relation to the enterprise computer network.

Figure 9:
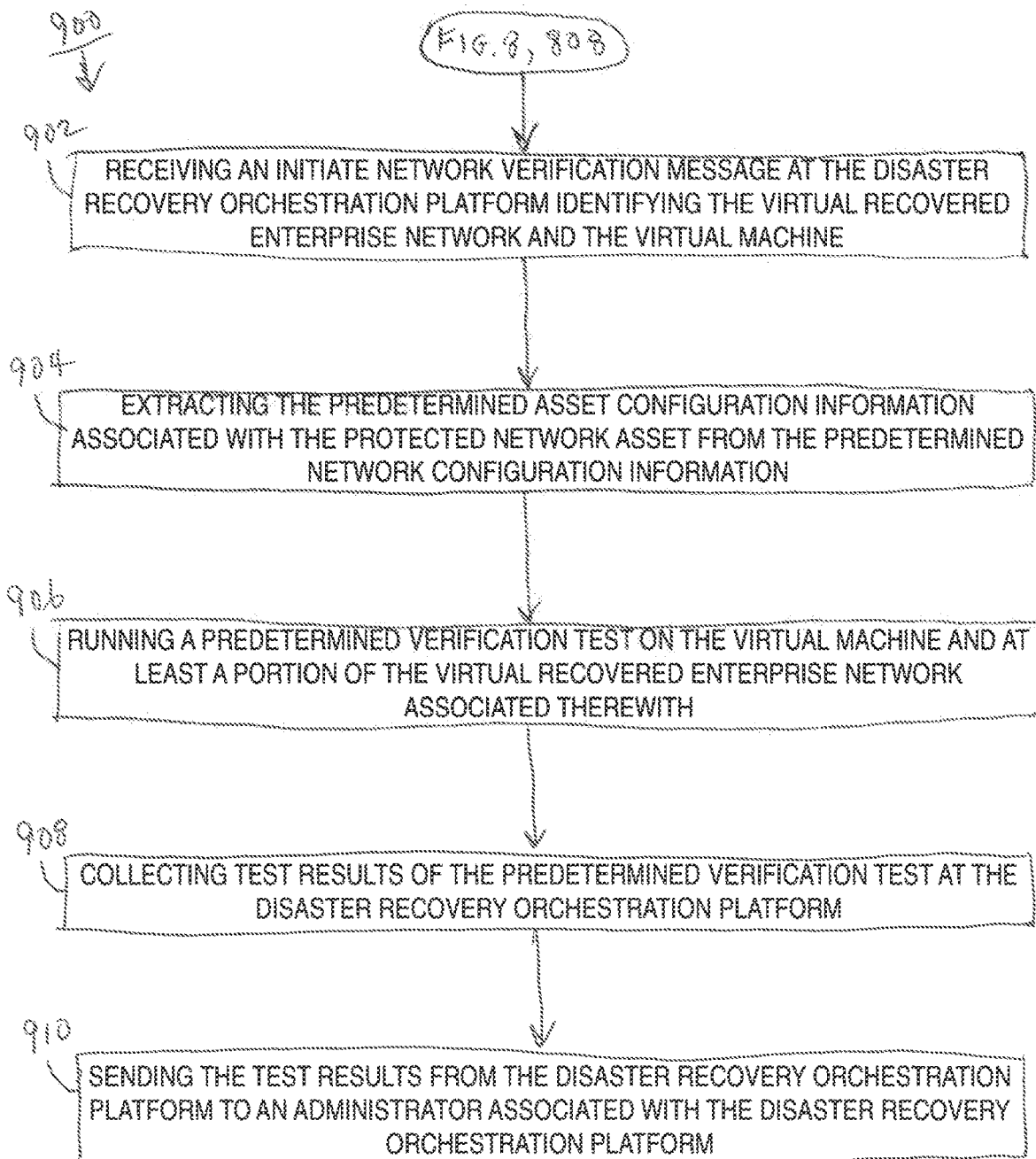
FIG. 9, in combination with FIGS. 7 and 8, is a flow chart showing yet another exemplary embodiment of a process facilitating business continuity of an enterprise computer network.

With reference to FIG. 9, another exemplary embodiment of a process 900 facilitating business continuity of an enterprise computer network includes the processes 700, 800 of FIGS. 7 and 8 and continues from 808 to 902 where an initiate network verification message is received at the disaster recovery orchestration platform identifying the virtual recovered enterprise network and the virtual machine. At 904, the predetermined asset configuration information associated with the protected network asset is extracted from the predetermined network configuration information. At 906, a predetermined verification test is run on the virtual machine and at least a portion of the virtual recovered enterprise network associated therewith based on the predetermined asset configuration information and at least a portion of the predetermined network configuration information associated therewith. At 908, test results of the predetermined verification test are collected at the disaster recovery orchestration platform. At 910, the test results are sent from the disaster recovery orchestration platform to an administrator associated with the disaster recovery orchestration platform. The test results are accessible to the administrator via an administrator computing device.

Figure 10:
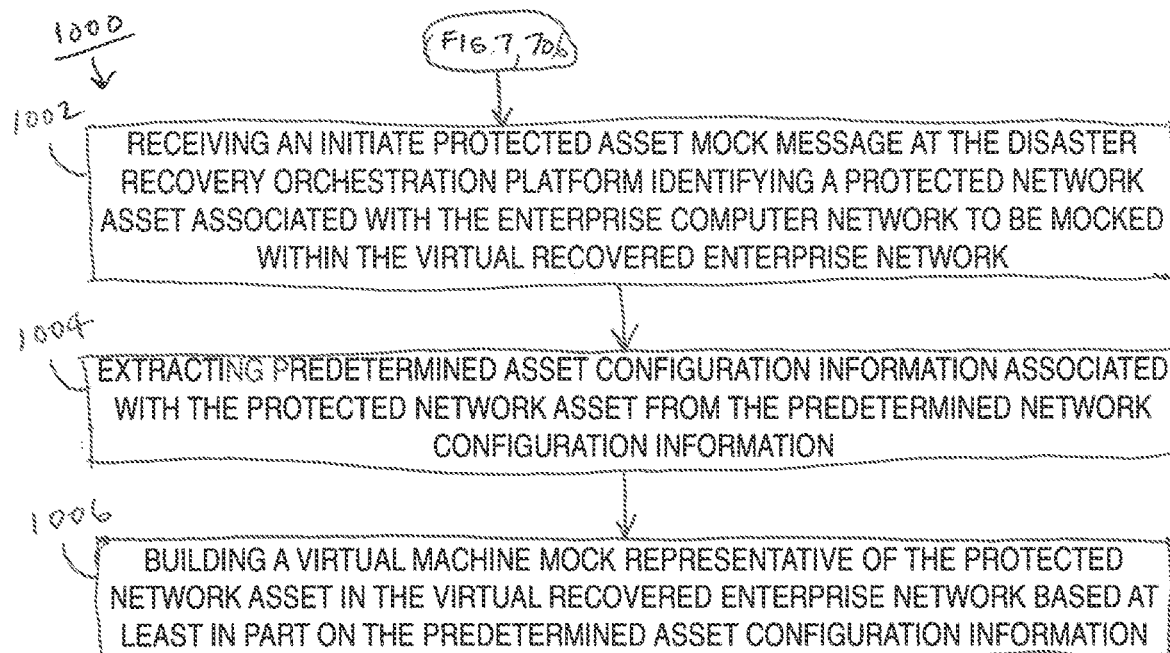
FIG. 10, in combination with FIG. 7, is a flow chart showing still another exemplary embodiment of a process facilitating business continuity of an enterprise computer network.

With reference to FIG. 10, another exemplary embodiment of a process 1000 facilitating business continuity of an enterprise computer network includes the process 700 of FIG. 7 and continues from 706 to 1002 where an initiate protected asset mock message is received at the disaster recovery orchestration platform identifying a protected network asset associated with the enterprise computer network to be mocked within the virtual recovered enterprise network. At 1004, predetermined asset configuration information associated with the protected network asset is extracted from the predetermined network configuration information. The predetermined asset configuration information includes asset interface information, asset operating parameters, variable parameter values, fixed parameter values, and the like. At 1006, a virtual machine mock representative of the protected network asset is built in the virtual recovered enterprise network based at least in part on the predetermined asset configuration information. The virtual machine mock is configured to fake responses that mimic at least a portion of the protected network asset.

In another embodiment, the process 1000 also includes sending an asset mocked message from the disaster recovery orchestration platform to an administrator associated with the disaster recovery orchestration platform indicating the protected network asset was mocked and the virtual machine mock is available. The asset mocked message is accessible to the administrator via an administrator computing device.

In yet another embodiment, the process 1000 also includes sending a mock failure message from the disaster recovery orchestration platform to an administrator associated with the disaster recovery orchestration platform indicating at least one of the protected network asset was not mocked and the virtual machine mock is not available. The mock failure message is accessible to the administrator via an administrator computing device.

In still another embodiment, the process 1000 also includes receiving a second initiate protected asset mock message at the disaster recovery orchestration platform identifying a second protected network asset associated with the enterprise computer network to be mocked within the virtual recovered enterprise network. Next, the extracting of the predetermined asset configuration information (1004) and the building of the virtual machine mock (1006) are performed for the second protected network asset identified in the second initiate protected asset mock message.

In still yet another embodiment of the process 1000, the initiate protected asset mock message identifies multiple protected network assets to be mocked within the virtual recovered enterprise network. Next, the extracting of the predetermined asset configuration information (1004) and the building of the virtual machine mock (1006) are performed for each protected network asset identified in the initiate protected asset mock message. In a further embodiment, the extracting of the predetermined asset configuration information (1004) and the building of the virtual machine mock (1006) for two or more protected network assets identified in the initiate protected asset mock message are performed in parallel.

Figure 11:
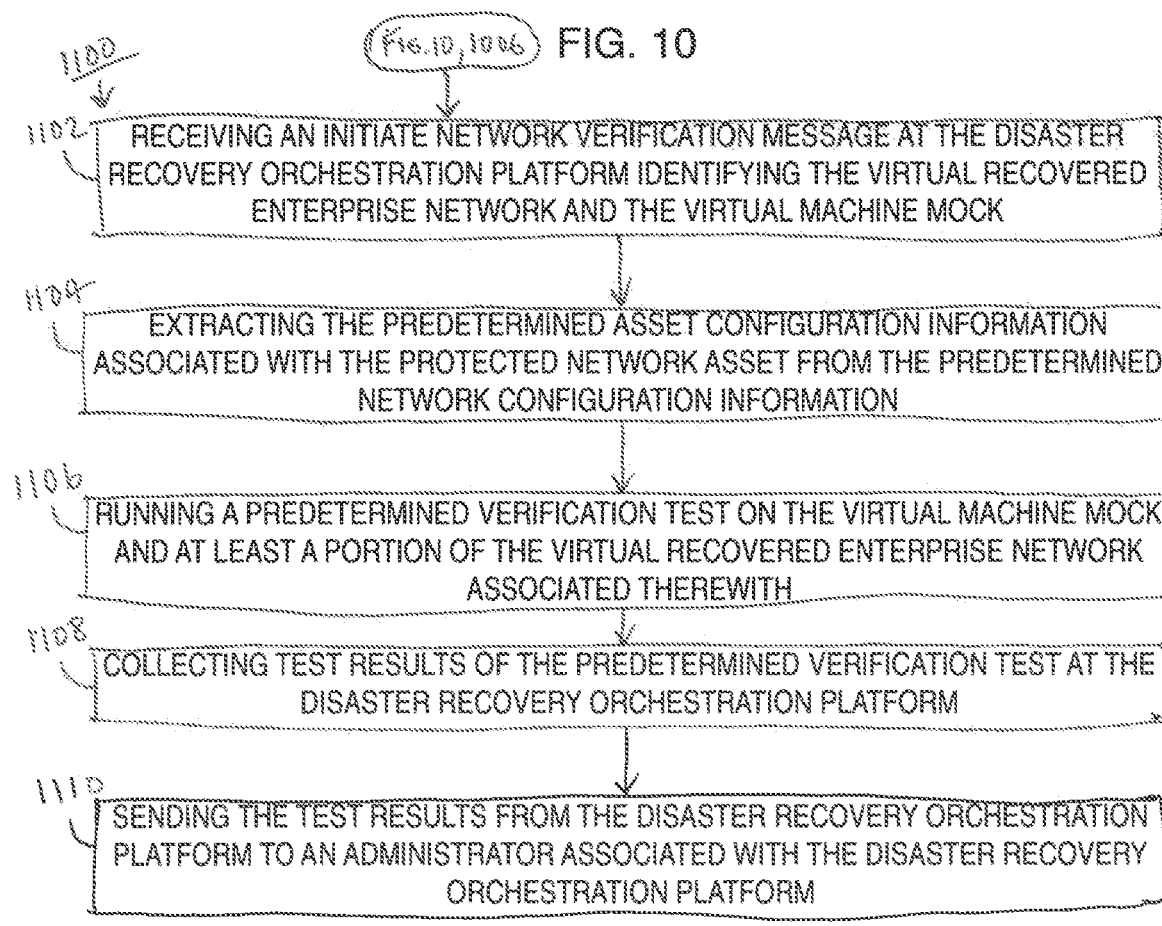
FIG. 11, in combination with FIGS. 7 and 10, is a flow chart showing still yet another exemplary embodiment of a process facilitating business continuity of an enterprise computer network.

With reference to FIG. 11, another exemplary embodiment of a process 1100 facilitating business continuity of an enterprise computer network includes the processes 700, 1000 of FIGS. 7 and 10 and continues from 1006 to 1102 where an initiate network verification message is received at the disaster recovery orchestration platform identifying the virtual recovered enterprise network and the virtual machine mock. At 1104, the predetermined asset configuration information associated with the protected network asset is extracted from the predetermined network configuration information. At 1106, a predetermined verification test is run on the virtual machine mock and at least a portion of the virtual recovered enterprise network associated therewith based on the predetermined asset configuration information and at least a portion of the predetermined network configuration information associated therewith. At 1108, test results of the predetermined verification test are collected at the disaster recovery orchestration platform. At 1110, the test results are sent from the disaster recovery orchestration platform to an administrator associated with the disaster recovery orchestration platform. The test results are accessible to the administrator via an administrator computing device.

Figure 12:
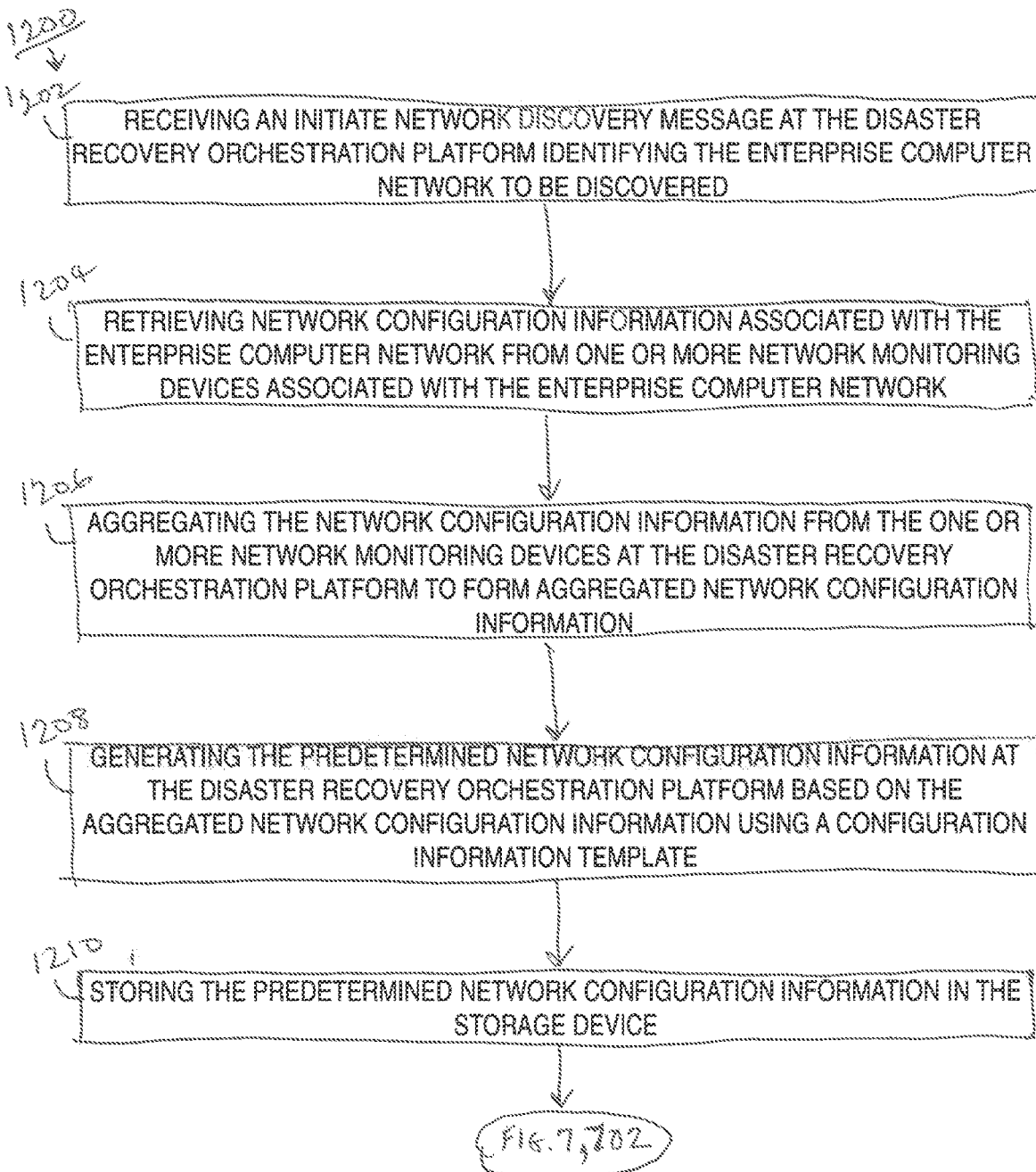
FIG. 12, in combination with FIG. 7, is a flow chart showing another exemplary embodiment of a process facilitating business continuity of an enterprise computer network.

With reference to FIG. 12, another exemplary embodiment of a process 1200 facilitating business continuity of an enterprise computer network includes the process 700 of FIG. 7 and begins at 1202 where an initiate network discovery message is received at the disaster recovery orchestration platform identifying the enterprise computer network to be discovered. At 1204, network configuration information associated with the enterprise computer network is retrieved from one or more network monitoring devices associated with the enterprise computer network. Each network monitoring device is configured to monitor at least a portion of the enterprise computer network, including monitoring of at least one protected network asset of the enterprise computer network. At 1206, the network configuration information from the one or more network monitoring devices is aggregated at the disaster recovery orchestration platform to form aggregated network configuration information. At 1208, the predetermined network configuration information is generated at the disaster recovery orchestration platform based on the aggregated network configuration information using a configuration information template. At 1210, the predetermined network configuration information is stored in the storage device. After 1210, the process 1200 continues to 702 of FIG. 7.

In another embodiment of the process 1200, the configuration information template is arranged in an electronic file. In a further embodiment, the electronic file is in a JavaScript object notation (JSON) file format. In another further embodiment, content of the electronic file includes a binary large object (BLOB) template. In yet another further embodiment, content of the electronic file includes schema templates for the enterprise computer network and the one or more protected network assets.

Figure 13:
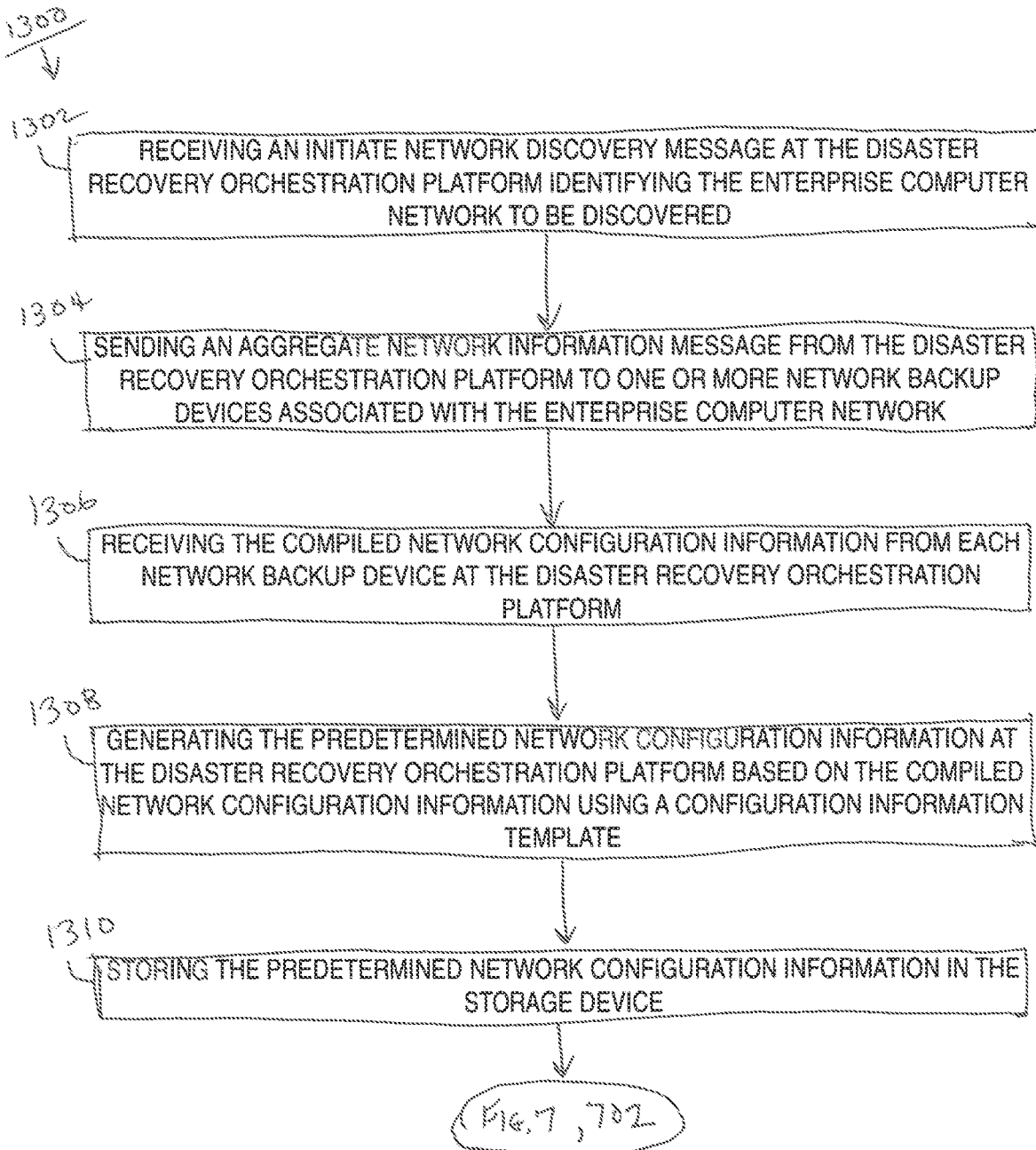
FIG. 13, in combination with FIG. 7, is a flow chart showing yet another exemplary embodiment of a process facilitating business continuity of an enterprise computer network.

With reference to FIG. 13, another exemplary embodiment of a process 1300 facilitating business continuity of an enterprise computer network includes the process 700 of FIG. 7 and begins at 1302 where an initiate network discovery message is received at the disaster recovery orchestration platform identifying the enterprise computer network to be discovered. At 1304, an aggregate network information message is sent from the disaster recovery orchestration platform to one or more network backup devices associated with the enterprise computer network. Each network backup device is configured to perform backups of at least a portion of the enterprise computer network to an enterprise network backup repository, including backups of protected network assets of the corresponding portion of the enterprise computer network. In response to the aggregate network information message, each network backup device compiles network configuration information from the portion of the enterprise computer network with which it is associated to form compiled network configuration information. At 1306, the compiled network configuration information is received from each network backup device at the disaster recovery orchestration platform. At 1308, the predetermined network configuration information is generated at the disaster recovery orchestration platform based on the compiled network configuration information using a configuration information template. At 1310, the predetermined network configuration information is stored in the storage device. After 1310, the process 1300 continues to 702 of FIG. 7.

In another embodiment, the process 1300 also includes aggregating the compiled network configuration information from multiple network backup devices at the disaster recovery orchestration platform to form aggregated network configuration information. Next, the predetermined network configuration information is generated at the disaster recovery orchestration platform based on the aggregated network configuration information using the configuration information template.

Figure 14:
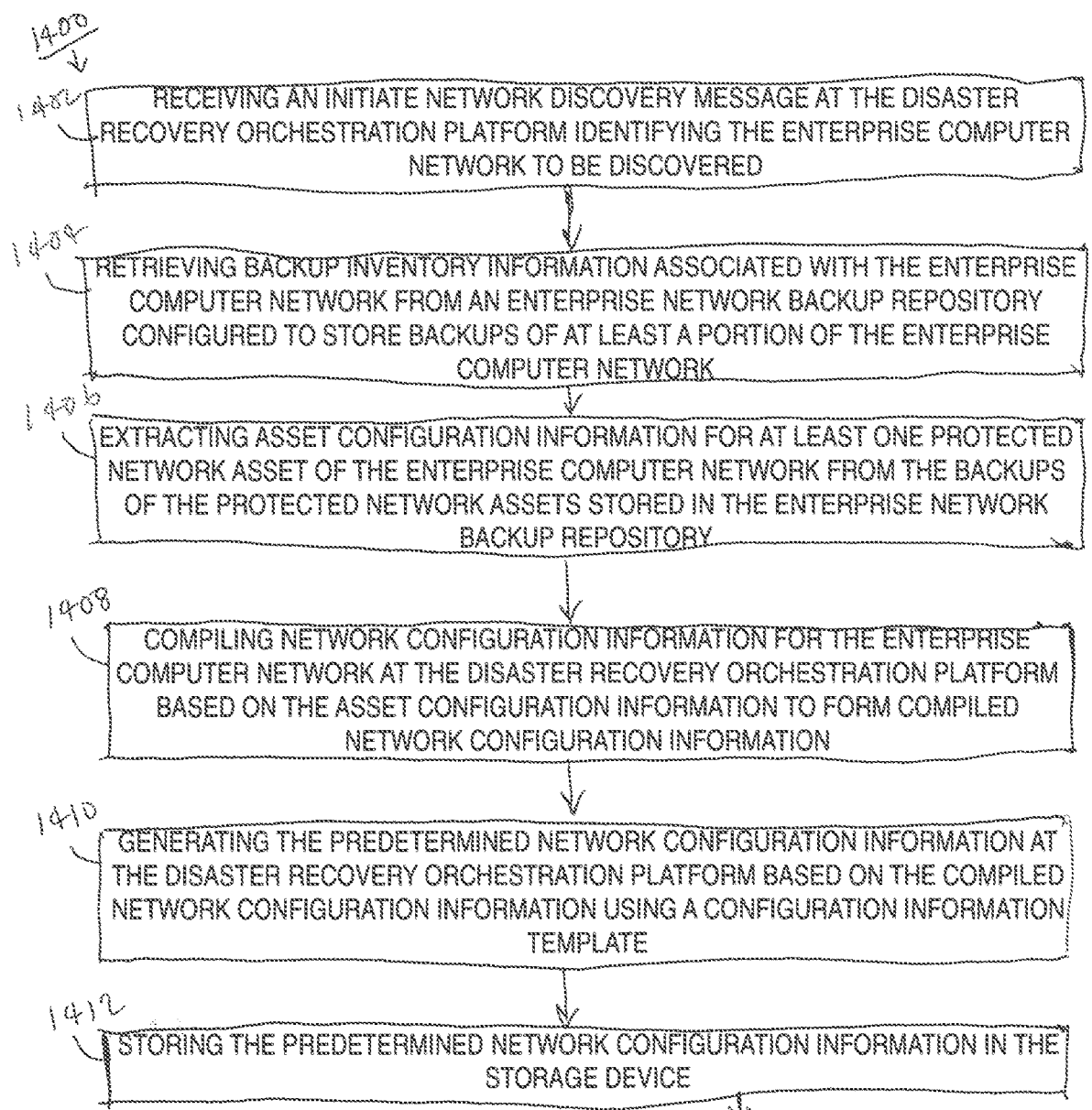
FIG. 14, in combination with FIG. 7, is a flow chart showing still another exemplary embodiment of a process facilitating business continuity of an enterprise computer network.

With reference to FIG. 14, another exemplary embodiment of a process 1400 facilitating business continuity of an enterprise computer network includes the process 700 of FIG. 7 and begins at 1402 where an initiate network discovery message is received at the disaster recovery orchestration platform identifying the enterprise computer network to be discovered. At 1404, backup inventory information associated with the enterprise computer network is retrieved from an enterprise network backup repository configured to store backup versions of at least a portion of the enterprise computer network, including backup versions of protected network assets of the enterprise computer network. At 1406, asset configuration information for at least one protected network asset of the enterprise computer network is extracted from the backup versions of the protected network assets stored in the enterprise network backup repository. At 1408, network configuration information for the enterprise computer network is compiled at the disaster recovery orchestration platform based on the asset configuration information to form compiled network configuration information. The compiling includes administrator interactions with the disaster recovery orchestration platform to define the network topology information, network node information, node interface information, and other network information based on the asset configuration information. The disaster recovery orchestration platform is accessible to the administrator via an administrator computing device. At 1410, the predetermined network configuration information is generated at the disaster recovery orchestration platform based on the compiled network configuration information using a configuration information template. At 1412, the predetermined network configuration information is stored in the storage device. After 1412, the process 1400 continues to 702 of FIG. 7.

Figure 15:
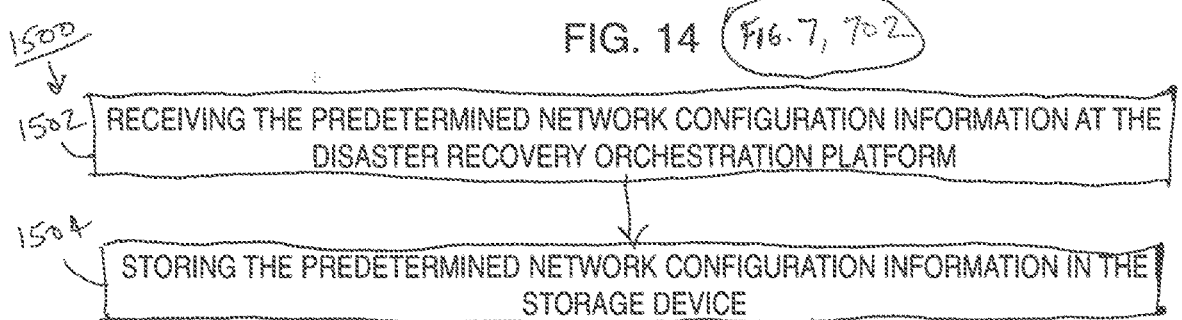
FIG. 15, in combination with FIG. 7, is a flow chart showing still yet another exemplary embodiment of a process facilitating business continuity of an enterprise computer network.

With reference to FIG. 15, another exemplary embodiment of a process 1500 facilitating business continuity of an enterprise computer network includes the process 700 of FIG. 7 and begins at 1502 where the predetermined network configuration information is received at the disaster recovery orchestration platform. The predetermined network configuration information having been generated by an administrator for the enterprise computer network after compiling configuration information for the enterprise computer network and at least one protected network asset of the enterprise computer network. The predetermined network configuration information having been generated using a configuration information template. At 1504, the predetermined network configuration information is stored in the storage device. After 1504, the process 1500 continues to 702 of FIG. 7. In another embodiment of the process 1500, the predetermined network configuration information is received from the administrator via an administrator computing device.

Figure 16:
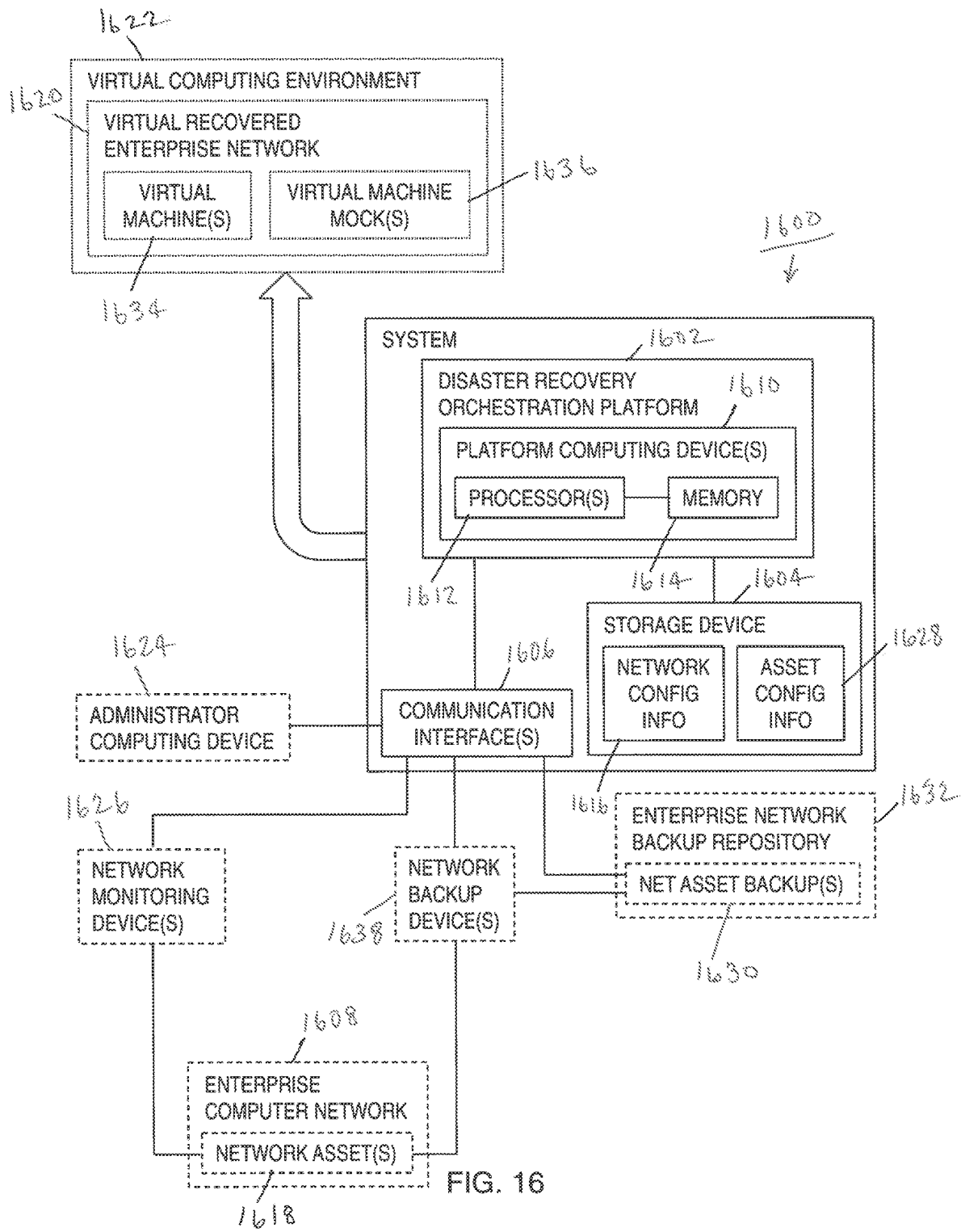
FIG. 16 is a block diagram showing an exemplary embodiment of a system facilitating business continuity of an enterprise computer network.

With reference to FIG. 16, an exemplary embodiment of a system 1600 to facilitate business continuity of an enterprise computer network includes a disaster recovery orchestration platform 1602 a storage device 1604, and at least one communication interface 1606. The disaster recovery orchestration platform 1602 configured to control and manage virtualization and recovery of an enterprise computer network 1608. The disaster recovery orchestration platform 1602 including at least one platform computing device 1610. Each platform computing device 1610 including at least one processor 1612 and associated memory 1614. The storage device 1604 in operative communication with the disaster recovery orchestration platform 1602 and configured to store predetermined network configuration information 1616 associated with the enterprise computer network 1608. The at least one communication interface 1606 in operative communication with the disaster recovery orchestration platform 1602. The disaster recovery orchestration platform 1602 is configured to receive an initiate network recovery message via the at least one communication interface 1606. The initiate network recovery message identifying an enterprise computer network (e.g., 1608) to be recovered. The disaster recovery orchestration platform 1602 is configured to retrieve the predetermined network configuration information 1616 from the storage device 1604. The predetermined network configuration information 1616 includes network topology information, network node information, node interface information, and like information. The predetermined network configuration information 1616 also identifies one or more protected network assets 1618. The disaster recovery orchestration platform 1602 is configured to build a virtual recovered enterprise network 1620 in a virtual computing environment 1622 based at least in part on the predetermined network configuration information 1616. The virtual recovered enterprise network 1620 mimics at least a portion of the enterprise computer network 1608.

In another embodiment of the system 1600, the disaster recovery orchestration platform 1602 is configured to receive the initiate network recovery message from an administrator via an administrator computing device 1624. In yet another embodiment of the system 1600, the disaster recovery orchestration platform 1602 is configured to receive the initiate network recovery message from a network monitoring device 1626 associated with the enterprise computer network 1608 in response to detection of a critical failure of at least one protected network asset 1618 of the enterprise computer network 1608.

In still another embodiment of the system 1600, the enterprise computer network 1608 includes a plurality of network assets distributed among multiple physical locations and interconnected via a combination of networks that form a hybrid communication network.

In still yet another embodiment of the system 1600, the virtual computing environment 1622 is offsite in relation to the enterprise computer network 1608. In another embodiment of the system 1600, the virtual computing environment 1622 includes at least one of a private cloud, a public cloud, and a hybrid cloud.

In yet another embodiment of the system 1600, the disaster recovery orchestration platform 1602 is configured to send a network recovered message to an administrator associated with the disaster recovery orchestration platform via the at least one communication interface 1606. The network recovered message indicating the enterprise computer network 1608 was recovered and the virtual recovered enterprise network 1620 is available. The network recovered message is accessible to the administrator via an administrator computing device 1624.

In still another embodiment of the system 1600, the disaster recovery orchestration platform 1602 is configured to send a recovery failure message to an administrator associated with the disaster recovery orchestration platform via the at least one communication interface 1606. The recovery failure message indicating at least one of the enterprise computer network 1608 was not recovered and the virtual recovered enterprise network 1620 is not available. The recovery failure message is accessible to the administrator via an administrator computing device 1624.

In still yet another embodiment of the system 1600, the disaster recovery orchestration platform 1602 is configured to receive an initiate protected asset restoration message via the at one communication interface 1606. The initiate asset restoration message identifying a protected network asset 1618 associated with the enterprise computer network 1608 to be restored to the virtual recovered enterprise network 1620. The disaster recovery orchestration platform 1602 is configured to extract predetermined asset configuration information 1628 associated with the protected network asset 1618 from the predetermined network configuration information 1616. The predetermined asset configuration information 1628 includes asset interface information, asset operating parameters, variable parameter values, fixed parameter values, and the like. The disaster recovery orchestration platform 1602 is configured to retrieve a backup version 1630 of the protected network asset 1618 from an enterprise network backup repository 1632 associated with the enterprise computer network 1608 via the at least one communication interface 1606. The disaster recovery orchestration platform 1602 is configured to build a virtual machine 1634 representative of the protected network asset 1618 in the virtual recovered enterprise network 1620 based at least in part on the predetermined asset configuration information 1628 and the backup version 1630 of the protected network asset 1618. The virtual machine 1634 mimics at least a portion of the protected network asset 1618.

In a further embodiment, the disaster recovery orchestration platform 1602 is configured to send an asset restored message to an administrator associated with the disaster recovery orchestration platform via the at least one communication interface 1606. The asset restored message indicating the protected network asset 1618 was restored and the virtual machine 1634 is available. The asset restored message is accessible to the administrator via an administrator computing device 1624.

In another further embodiment, the disaster recovery orchestration platform 1602 is configured to send a restore failure message to an administrator associated with the disaster recovery orchestration platform via the at least one communication interface 1606. The restore failure message indicating at least one of the protected network asset 1618 was not restored and the virtual machine 1634 is not available. The restore failure message is accessible to the administrator via an administrator computing device 1624.

In yet another further embodiment, the disaster recovery orchestration platform 1602 is configured to receive a second initiate protected asset restoration message via the at least one communication interface 1606. The second initiate protected asset restoration message identifying a second protected network asset 1618 associated with the enterprise computer network 1608 to be restored to the virtual recovered enterprise network 1620. The disaster recovery orchestration platform 1602 is configured to perform the extracting of the predetermined asset configuration information 1628, the retrieving of the backup version 1630, and the building of the virtual machine 1634 for the second protected network asset 1618 identified in the second initiate protected asset restoration message.

In still another further embodiment, the initiate protected asset restoration message identifies multiple protected network assets 1618 to be restored to the virtual recovered enterprise network 1620. The disaster recovery orchestration platform 1602 is configured to perform the extracting of the predetermined asset configuration information 1628, the retrieving of the backup version 1630, and the building of the virtual machine 1634 for each protected network asset 1618 identified in the initiate protected asset restoration message. In an even further embodiment, the disaster recovery orchestration platform 1602 is configured to perform the extracting of the predetermined asset configuration information 1628, the retrieving of the backup version 1630, and the building of the virtual machine 1634 for two or more protected network assets 1618 identified in the initiate protected asset restoration message in parallel.

In still yet another further embodiment, the disaster recovery orchestration platform 1602 is configured to select the backup version 1630 of the protected network asset 1618 from a plurality of backup versions of the protected network asset stored in the enterprise network backup repository 1632. In another further embodiment, the enterprise network backup repository 1632 is offsite in relation to the enterprise computer network 1608.

In yet another further embodiment, the disaster recovery orchestration platform 1602 is configured to receive an initiate network verification message via the at least one communication interface 1606. The initiate network verification message identifying the virtual recovered enterprise network 1620 and the virtual machine 1634. The disaster recovery orchestration platform 1602 is configured to extract the predetermined asset configuration information 1628 associated with the protected network asset 1618 from the predetermined network configuration information 1616. The disaster recovery orchestration platform 1602 is configured to run a predetermined verification test on the virtual machine 1634 and at least a portion of the virtual recovered enterprise network 1620 associated therewith based on the predetermined asset configuration information 1628 and at least a portion of the predetermined network configuration information 1616 associated therewith. The disaster recovery orchestration platform 1602 is configured to collect test results of the predetermined verification test. The disaster recovery orchestration platform 1602 is configured to send the test results to an administrator associated with the disaster recovery orchestration platform via the at least one communication interlace 1606. The test results are accessible to the administrator via an administrator computing device 1624.

In another embodiment of the system 1600, the disaster recovery orchestration platform 1602 is configured to receive an initiate protected asset mock message via the at least one communication interface 1606. The initiate protected asset mock message identifying a protected network asset 1618 associated with the enterprise computer network 1608 to be mocked within the virtual recovered enterprise network 1620. The disaster recovery orchestration platform 1602 is configured to extract predetermined asset configuration information 1628 associated with the protected network asset 1618 from the predetermined network configuration information 1616. The predetermined asset configuration information 1628 includes asset interface information, asset operating parameters, variable parameter values, fixed parameter values, and the like. The disaster recovery orchestration platform 1602 is configured to build a virtual machine mock 1636 representative of the protected network asset 1618 in the virtual recovered enterprise network 1620 based at least in part on the predetermined asset configuration information 1628. The virtual machine mock 1636 is configured to fake responses that mimic at least a portion of the protected network asset 1618.

In a further embodiment, the disaster recovery orchestration platform 1602 is configured to send an asset mocked message to an administrator associated with the disaster recovery orchestration platform via the at least one communication interface 1606. The asset mocked message indicating the protected network asset 1618 was mocked and the virtual machine mock 1636 is available. The asset mocked message is accessible to the administrator via an administrator computing device 1624.

In another further embodiment, the disaster recovery orchestration platform 1602 is configured to send a mock failure message to an administrator associated with the disaster recovery orchestration platform via the at least one communication interface 1606. The mock failure message indicating at least one of the protected network asset 1618 was not mocked and the virtual machine mock 1636 is not available. The mock failure message is accessible to the administrator via an administrator computing device 1624.

In yet another further embodiment, the disaster recovery orchestration platform 1602 is configured to receive a second initiate protected asset mock message via the at least one communication interface 1606. The second initiate protected asset mock message identifying a second protected network asset 1618 associated with the enterprise computer network 1608 to be mocked within the virtual recovered enterprise network 1620. The disaster recovery orchestration platform 1602 is configured to perform the extracting of the predetermined asset configuration information 1628 and the building of the virtual machine mock 1636 for the second protected network asset 1618 identified in the second initiate protected asset mock message.

In still another further embodiment, the initiate protected asset mock message identifies multiple protected network assets 1618 to be mocked within the virtual recovered enterprise network 1620. The disaster recovery orchestration platform 1602 is configured to perform the extracting of the predetermined asset configuration information 1628 and the building of the virtual machine mock 1636 for each protected network asset 1618 identified in the initiate protected asset mock message. In an even further embodiment, the disaster recovery orchestration platform 1602 is configured to perform the extracting of the predetermined asset configuration information 1628 and the building of the virtual machine mock 1636 for two or more protected network assets 1618 identified in the initiate protected asset mock message in parallel.

In still yet another further embodiment, the disaster recovery orchestration platform 1602 is configured to receive an initiate network verification message via the at least one communication interface 1606. The initiate network verification message identifying the virtual recovered enterprise network 1620 and the virtual machine mock 1636. The disaster recovery orchestration platform 1602 is configured to extract the predetermined asset configuration information 1628 associated with the protected network asset 1618 from the predetermined network configuration information 1616. The disaster recovery orchestration platform 1602 is configured to run a predetermined verification test on the virtual machine mock 1636 and at least a portion of the virtual recovered enterprise network 1620 associated therewith based on the predetermined asset configuration information 1628 and at least a portion of the predetermined network configuration information 1616 associated therewith. The disaster recovery orchestration platform 1602 is configured to collect test results of the predetermined verification test. The disaster recovery orchestration platform 1602 is configured to send the test results to an administrator associated with the disaster recovery orchestration platform via the at least one communication interface 1606. The test results are accessible to the administrator via an administrator computing device 1624.

In yet another embodiment of the system 1600, the disaster recovery orchestration platform 1602 is configured to receive an initiate network discovery message via the at least one communication interface 1606. The initiate network discovery message identifying the enterprise computer network 1608 to be discovered. The disaster recovery orchestration platform 1602 is configured to retrieve network configuration information associated with the enterprise computer network 1608 from one or more network monitoring devices 1626 associated with the enterprise computer network via the at least one communication interface 1606. Each network monitoring device 1626 is configured to monitor at least a portion of the enterprise computer network 1608, including monitoring of at least one protected network asset 1618 of the enterprise computer network. The disaster recovery orchestration platform 1602 is configured to aggregate the network configuration information from the one or more network monitoring devices 1626 to form aggregated network configuration information. The disaster recovery orchestration platform 1602 is configured to generate the predetermined network configuration information 1616 based on the aggregated network configuration information using a configuration information template. The disaster recovery orchestration platform 1602 is configured to store the predetermined network configuration information 1616 in the storage device 1604.

In a further embodiment, at least a portion of the one or more network monitoring devices 1626 are offsite in relation to the at least one protected network asset 1618 being monitored by the corresponding network monitoring device. In another further embodiment, at least a portion of the one or more network monitoring devices 1626 are on-premises in relation to the at least one protected network asset 1618 being monitored by the corresponding network monitoring device. In yet another further embodiment, the one or more network monitoring devices include at least one network monitoring and management device.

In still another embodiment of the system 1600, the disaster recovery orchestration platform 1602 is configured to receive an initiate network discovery message via the at least one communication interface 1606. The initiate network discovery message identifying the enterprise computer network 1608 to be discovered. The disaster recovery orchestration platform 1602 is configured to send an aggregate network information message to one or more network backup devices 1638 associated with the enterprise computer network 1608 via the at least one communication interface 1606. Each network backup device 1638 is configured to perform backups of at least a portion of the enterprise computer network 1608 to an enterprise network backup repository 1632, including backups of protected network assets 1618 of the corresponding portion of the enterprise computer network 1608. In response to the aggregate network information message, each network backup device 1638 compiles network configuration information from the portion of the enterprise computer network 1608 with which it is associated to form compiled network configuration information. The disaster recovery orchestration platform 1602 is configured to receive the compiled network configuration information from each network backup device 1638 via the at least one communication interface 1606. The disaster recovery orchestration platform 1602 is configured to generate the predetermined network configuration information 1628 based on the compiled network configuration information using a configuration information template. The disaster recovery orchestration platform 1602 is configured to store the predetermined network configuration information 1628 in the storage device 1604.

In a further embodiment, the disaster recovery orchestration platform 1602 is configured to aggregate the compiled network configuration information from multiple network backup devices 1638 to form aggregated network configuration information. The disaster recovery orchestration platform 1602 is configured to generate the predetermined network configuration information 1628 based on the aggregated network configuration information using the configuration information template.

In another further embodiment, at least a portion of the one or more network backup devices 1638 are offsite in relation to the portion of the enterprise computer network 1608 with which the corresponding network backup device is associated. In yet another further embodiment, at least a portion of the one or more network backup devices 1638 are on-premises in relation to the portion of the enterprise computer network 1608 with which the corresponding network backup device is associated. In still another further embodiment, the one or more network backup devices 1638 include at least one network backup and local recovery device.

In still yet another embodiment of the system 1600, the disaster recovery orchestration platform 1602 is configured to receive an initiate network discovery message via the at least one communication interface 1606. The initiate network discovery message identifying the enterprise computer network 1608 to be discovered. The disaster recovery orchestration platform 1602 is configured to retrieve backup inventory information associated with the enterprise computer network 1608 from an enterprise network backup repository 1632 via the at least one communication interface 1606. The enterprise network backup repository 1632 is configured to store backup versions of at least a portion of the enterprise computer network 1608, including backup versions 1630 of protected network assets 1618 of the enterprise computer network. The disaster recovery orchestration platform 1602 is configured to extract asset configuration information for at least one protected network asset 1618 of the enterprise computer network 1608 from the backup versions 1630 of the protected network assets 1618 stored in the enterprise network backup repository 1632 via the at least one communication interface 1606. The disaster recovery orchestration platform 1602 is configured to compile network configuration information for the enterprise computer network 1608 based on the asset configuration information to form compiled network configuration information. The compiling includes administrator interactions with the disaster recovery orchestration platform 1602 to define the network topology information, network node information, node interface information, and other network information based on the asset configuration information. The disaster recovery orchestration platform 1602 is accessible to the administrator via an administrator computing device 1624. The disaster recovery orchestration platform 1602 is configured to generate the predetermined network configuration information 1616 based on the compiled network configuration information using a configuration information template. The disaster recovery orchestration platform 1602 is configured to store the predetermined network configuration information 1616 in the storage device 1604.

In another embodiment of the system 1600, the disaster recovery orchestration platform 1602 is configured to receive the predetermined network configuration information 1616 via the at least one communication interface 1606. The predetermined network configuration information 1616 having been generated by an administrator for the enterprise computer network after compiling configuration information for the enterprise computer network 1608 and at least one protected network asset 1618 of the enterprise computer network. The predetermined network configuration information 1616 having been generated using a configuration information template. The disaster recovery orchestration platform 1602 is configured to store the predetermined network configuration information 1615 in the storage device 1604. In a further embodiment, the predetermined network configuration information 1616 is received from the administrator via an administrator computing device 1624.

With reference to FIGS. 7-16, various exemplary embodiments of non-transitory computer-readable medium storing program instructions that, when executed by at least one platform computing device 1610 or at least one processor 1612, cause a computer-controlled orchestration platform 1602 to perform a method facilitating business continuity of an enterprise computer network 1608. For example, various embodiments of a system 1600 and a disaster recovery orchestration platform 1602 within the system are described above with reference to FIG. 16. Various embodiments of the method facilitating business continuity of an enterprise computer network are described above with reference to FIGS. 7-15. In other words, the program instructions of the various exemplary embodiments of non-transitory computer-readable medium are defined by any suitable combination of the processes 700, 800, 900, 1000, 1100, 1200, 1300, 1400, and 1500 described above with reference to FIGS. 7-15. Similarly, the at least one platform computing device 1610 or the at least one processor 1612 associated with the various exemplary embodiments of non-transitory computer-readable medium are defined by any suitable combination of the system 1600 and disaster recovery orchestration platform 1602 described above with reference to FIG. 16.

Some portions of the detailed description herein are presented in terms of algorithms and symbolic representations of operations on data bits performed by conventional computer components, including a central processing unit (CPU) (e.g., processor), memory storage devices for the CPU, and connected display devices. These algorithmic descriptions and representations are the means used by those skilled in the data processing arts to convey the substance of their work most effectively to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiments are not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical, or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A method facilitating business continuity of an enterprise computer network, comprising:
   receiving an initiate network recovery message at a disaster recovery orchestration platform identifying an enterprise computer network to be recovered, the disaster recovery orchestration platform including at least one platform computing device, each platform computing device including at least one processor and associated memory;
   retrieving predetermined network configuration information associated with the enterprise computer network from a storage device accessible to the disaster recovery orchestration platform;
   building a virtual recovered enterprise network in a virtual computing environment based at least in part on the predetermined network configuration information;
   receiving an initiate protected asset restoration message at the disaster recovery orchestration platform identifying a protected network asset associated with the enterprise computer network to be restored to the virtual recovered enterprise network;
   extracting predetermined asset configuration information associated with the protected network asset from the predetermined network configuration information, wherein the predetermined asset configuration information includes asset interface information, asset operating parameters, variable parameter values, and fixed parameter values;
   retrieving a backup version of the protected network asset from an enterprise network backup repository associated with the enterprise computer network; and
   building a virtual machine representative of the protected network asset in the virtual recovered enterprise network based at least in part on the predetermined asset configuration information and the backup version of the protected network asset.

2. The method of claim 1, further comprising:
   sending a network recovered message from the disaster recovery orchestration platform to an administrator associated with the disaster recovery orchestration platform indicating the enterprise computer network was recovered and the virtual recovered enterprise network is available, wherein the network recovered message is accessible to the administrator via an administrator computing device.

3. The method of claim 1, further comprising:
   sending a recovery failure message from the disaster recovery orchestration platform to an administrator associated with the disaster recovery orchestration platform indicating at least one of the enterprise computer network was not recovered and the virtual recovered enterprise network is not available, wherein the recovery failure message is accessible to the administrator via an administrator computing device.

4. The method of claim 1, further comprising:
   receiving a second initiate protected asset restoration message at the disaster recovery orchestration platform identifying a second protected network asset associated with the enterprise computer network to be restored to the virtual recovered enterprise network; and
   performing the extracting of the predetermined asset configuration information, the retrieving of the backup version, and the building of the virtual machine for the second protected network asset identified in the second initiate protected asset restoration message.

5. The method of claim 1, wherein the initiate protected asset restoration message identifies multiple protected network assets to be restored to the virtual recovered enterprise network, the method further comprising:
   performing the extracting of the predetermined asset configuration information, the retrieving of the backup version, and the building of the virtual machine for each protected network asset identified in the initiate protected asset restoration message.

6. The method of claim 1, further comprising:
   receiving an initiate network verification message at the disaster recovery orchestration platform identifying the virtual recovered enterprise network and the virtual machine;
   extracting the predetermined asset configuration information associated with the protected network asset from the predetermined network configuration information;
   running a predetermined verification test on the virtual machine and at least a portion of the virtual recovered enterprise network associated therewith based on the predetermined asset configuration information and at least a portion of the predetermined network configuration information associated therewith;
   collecting test results of the predetermined verification test at the disaster recovery orchestration platform; and
   sending the test results from the disaster recovery orchestration platform to an administrator associated with the disaster recovery orchestration platform, wherein the test results are accessible to the administrator via an administrator computing device.

7. The method of claim 1, further comprising:
   receiving an initiate protected asset mock message at the disaster recovery orchestration platform identifying the protected network asset associated with the enterprise computer network to be mocked within the virtual recovered enterprise network;
   extracting the predetermined asset configuration information associated with the protected network asset from the predetermined network configuration information; and
   building a virtual machine mock representative of the protected network asset in the virtual recovered enterprise network based at least in part on the predetermined asset configuration information.

8. The method of claim 7, further comprising:
   receiving a second initiate protected asset mock message at the disaster recovery orchestration platform identifying a second protected network asset associated with the enterprise computer network to be mocked within the virtual recovered enterprise network; and performing the extracting of the predetermined asset configuration information and the building of the virtual machine mock for the second protected network asset identified in the second initiate protected asset mock message.

9. The method of claim 7, wherein the initiate protected asset mock message identifies multiple protected network assets to be mocked within the virtual recovered enterprise network, the method further comprising:

performing the extracting of the predetermined asset configuration information and the building of the virtual machine mock for each protected network asset identified in the initiate protected asset mock message.

10. The method of claim 7, further comprising:

receiving an initiate network verification message at the disaster recovery orchestration platform identifying the virtual recovered enterprise network and the virtual machine mock;

extracting the predetermined asset configuration information associated with the protected network asset from the predetermined network configuration information;

running a predetermined verification test on the virtual machine mock and at least a portion of the virtual recovered enterprise network associated therewith based on the predetermined asset configuration information and at least a portion of the predetermined network configuration information associated therewith;

collecting test results of the predetermined verification test at the disaster recovery orchestration platform; and sending the test results from the disaster recovery orchestration platform to an administrator associated with the disaster recovery orchestration platform, wherein the test results are accessible to the administrator via an administrator computing device.

11. The method of claim 1, further comprising:

receiving an initiate network discovery message at the disaster recovery orchestration platform identifying the enterprise computer network to be discovered;

retrieving network configuration information associated with the enterprise computer network from one or more network monitoring devices associated with the enterprise computer network, wherein each network monitoring device is configured to monitor at least a portion of the enterprise computer network, including monitoring of at least one protected network asset of the enterprise computer network;

aggregating the network configuration information from the one or more network monitoring devices at the disaster recovery orchestration platform to form aggregated network configuration information;

generating the predetermined network configuration information at the disaster recovery orchestration platform based on the aggregated network configuration information using a configuration information template; and storing the predetermined network configuration information in the storage device.

12. The method of claim 1, further comprising:

receiving an initiate network discovery message at the disaster recovery orchestration platform identifying the enterprise computer network to be discovered;

sending an aggregate network information message from the disaster recovery orchestration platform to one or more network backup devices associated with the enterprise computer network, wherein each network backup device is configured to perform backups of at least a portion of the enterprise computer network to an enterprise network backup repository, including backups of protected network assets of the corresponding portion of the enterprise computer network, wherein, in response to the aggregate network information message, each network backup device compiles network configuration information from the portion of the enterprise computer network with which it is associated to form compiled network configuration information;

receiving the compiled network configuration information from each network backup device at the disaster recovery orchestration platform;

generating the predetermined network configuration information at the disaster recovery orchestration platform based on the compiled network configuration information using a configuration information template; and storing the predetermined network configuration information in the storage device.

13. The method of claim 1, further comprising:

receiving an initiate network discovery message at the disaster recovery orchestration platform identifying the enterprise computer network to be discovered;

retrieving backup inventory information associated with the enterprise computer network from an enterprise network backup repository configured to store backup versions of at least a portion of the enterprise computer network, including backup versions of protected network assets of the enterprise computer network;

extracting asset configuration information for at least one protected network asset of the enterprise computer network from the backup versions of the protected network assets stored in the enterprise network backup repository;

compiling network configuration information for the enterprise computer network at the disaster recovery orchestration platform based on the asset configuration information to form compiled network configuration information, wherein the compiling includes administrator interactions with the disaster recovery orchestration platform to define network topology information, network node information, node interface information, and other network information based on the asset configuration information, wherein the disaster recovery orchestration platform is accessible to the administrator via an administrator computing device;

generating the predetermined network configuration information at the disaster recovery orchestration platform based on the compiled network configuration information using a configuration information template; and storing the predetermined network configuration information in the storage device.

14. The method of claim 1, further comprising:

receiving the predetermined network configuration information at the disaster recovery orchestration platform, the predetermined network configuration information having been generated by an administrator for the enterprise computer network after compiling configuration information for the enterprise computer network and at least one protected network asset of the enterprise computer network, the predetermined network configuration information having been generated using a configuration information template; and storing the predetermined network configuration information in the storage device.

15. A system to facilitate business continuity of an enterprise computer network, comprising:
a disaster recovery orchestration platform configured to control and manage virtualization and recovery of an enterprise computer network, the disaster recovery orchestration platform including at least one platform computing device, each platform computing device including at least one processor and associated memory;
a storage device in operative communication with the disaster recovery orchestration platform and configured to store predetermined network configuration information associated with the enterprise computer network; and
at least one communication interface in operative communication with the disaster recovery orchestration platform;
wherein the disaster recovery orchestration platform is configured to receive an initiate network recovery message via the at least one communication interface, the initiate network recovery message identifying an enterprise computer network to be recovered;
wherein the disaster recovery orchestration platform is configured to retrieve the predetermined network configuration information from the storage device;
wherein the disaster recovery orchestration platform is configured to build a virtual recovered enterprise network in a virtual computing environment based at least in part on the predetermined network configuration information;
wherein the disaster recovery orchestration platform is configured to receive an initiate protected asset restoration message via the at least one communication interface, the initiate protected asset restoration message identifying a protected network asset associated with the enterprise computer network to be restored to the virtual recovered enterprise network;
wherein the disaster recovery orchestration platform is configured to extract predetermined asset configuration information associated with the protected network asset from the predetermined network configuration information, wherein the predetermined asset configuration information includes asset interface information, asset operating parameters, variable parameter values, and fixed parameter values;
wherein the disaster recovery orchestration platform is configured to retrieve a backup version of the protected network asset from an enterprise network backup repository associated with the enterprise computer network via the at least one communication interface;
wherein the disaster recovery orchestration platform is configured to build a virtual machine representative of the protected network asset in the virtual recovered enterprise network based at least in part on the predetermined asset configuration information and the backup version of the protected network asset.

16. The system of claim 15, wherein the disaster recovery orchestration platform is configured to receive an initiate network verification message via the at least one communication interface, the initiate network verification message identifying the virtual recovered enterprise network and the virtual machine;
wherein the disaster recovery orchestration platform is configured to extract the predetermined asset configuration information associated with the protected network asset from the predetermined network configuration information;
wherein the disaster recovery orchestration platform is configured to run a predetermined verification test on the virtual machine and at least a portion of the virtual recovered enterprise network associated therewith based on the predetermined asset configuration information and at least a portion of the predetermined network configuration information associated therewith;
wherein the disaster recovery orchestration platform is configured to collect test results of the predetermined verification test;
wherein the disaster recovery orchestration platform is configured to send the test results to an administrator associated with the disaster recovery orchestration platform via the at least one communication interface, wherein the test results are accessible to the administrator via an administrator computing device.

17. The system of claim 15, wherein the disaster recovery orchestration platform is configured to receive an initiate protected asset mock message via the at least one communication interface, the initiate protected asset mock message identifying the protected network asset associated with the enterprise computer network to be mocked within the virtual recovered enterprise network;
wherein the disaster recovery orchestration platform is configured to extract the predetermined asset configuration information associated with the protected network asset from the predetermined network configuration information;
wherein the disaster recovery orchestration platform is configured to build a virtual machine mock representative of the protected network asset in the virtual recovered enterprise network based at least in part on the predetermined asset configuration information.

18. The system of claim 17, wherein the disaster recovery orchestration platform is configured to receive an initiate network verification message via the at least one communication interface, the initiate network verification message identifying the virtual recovered enterprise network and the virtual machine mock;
wherein the disaster recovery orchestration platform is configured to extract the predetermined asset configuration information associated with the protected network asset from the predetermined network configuration information;
wherein the disaster recovery orchestration platform is configured to run a predetermined verification test on the virtual machine mock and at least a portion of the virtual recovered enterprise network associated therewith based on the predetermined asset configuration information and at least a portion of the predetermined network configuration information associated therewith;
wherein the disaster recovery orchestration platform is configured to collect test results of the predetermined verification test;
wherein the disaster recovery orchestration platform is configured to send the test results to an administrator associated with the disaster recovery orchestration platform via the at least one communication interface, wherein the test results are accessible to the administrator via an administrator computing device.

19. The system of claim 15, wherein the disaster recovery orchestration platform is configured to receive an initiate network discovery message via the at least one communication interface, the initiate network discovery message identifying the enterprise computer network to be discovered;

wherein the disaster recovery orchestration platform is configured to retrieve network configuration information associated with the enterprise computer network from one or more network monitoring devices associated with the enterprise computer network via the at least one communication interface, wherein each network monitoring device is configured to monitor at least a portion of the enterprise computer network, including monitoring of at least one protected network asset of the enterprise computer network;

wherein the disaster recovery orchestration platform is configured to aggregate the network configuration information from the one or more network monitoring devices to form aggregated network configuration information;

wherein the disaster recovery orchestration platform is configured to generate the predetermined network configuration information based on the aggregated network configuration information using a configuration information template;

wherein the disaster recovery orchestration platform is configured to store the predetermined network configuration information in the storage device.

20. The system of claim 15, wherein the disaster recovery orchestration platform is configured to receive an initiate network discovery message via the at least one communication interface, the initiate network discovery message identifying the enterprise computer network to be discovered;

wherein the disaster recovery orchestration platform is configured to send an aggregate network information message to one or more network backup devices associated with the enterprise computer network via the at least one communication interface, wherein each network backup device is configured to perform backups of at least a portion of the enterprise computer network to an enterprise network backup repository, including backups of protected network assets of the corresponding portion of the enterprise computer network, wherein, in response to the aggregate network information message, each network backup device compiles network configuration information from the portion of the enterprise computer network with which it is associated to form compiled network configuration information;

wherein the disaster recovery orchestration platform is configured to receive the compiled network configuration information from each network backup device via the at least one communication interface;

wherein the disaster recovery orchestration platform is configured to generate the predetermined network configuration information based on the compiled network configuration information using a configuration information template;

wherein the disaster recovery orchestration platform is configured to store the predetermined network configuration information in the storage device.

21. The system of claim 15, wherein the disaster recovery orchestration platform is configured to receive an initiate network discovery message via the at least one communication interface, the initiate network discovery message identifying the enterprise computer network to be discovered;

wherein the disaster recovery orchestration platform is configured to retrieve backup inventory information associated with the enterprise computer network from an enterprise network backup repository via the at least one communication interface, wherein the enterprise network backup repository is configured to store backup versions of at least a portion of the enterprise computer network, including backup versions of protected network assets of the enterprise computer network;

wherein the disaster recovery orchestration platform is configured to extract asset configuration information for at least one protected network asset of the enterprise computer network from the backup versions of the protected network assets stored in the enterprise network backup repository via the at least one communication interface;

wherein the disaster recovery orchestration platform is configured to compile network configuration information for the enterprise computer network based on the asset configuration information to form compiled network configuration information, wherein the compiling includes administrator interactions with the disaster recovery orchestration platform to define network topology information, network node information, node interface information, and other network information based on the asset configuration information, wherein the disaster recovery orchestration platform is accessible to the administrator via an administrator computing device;

wherein the disaster recovery orchestration platform is configured to generate the predetermined network configuration information based on the compiled network configuration information using a configuration information template;

wherein the disaster recovery orchestration platform is configured to store the predetermined network configuration information in the storage device.

22. The system of claim 15, wherein the disaster recovery orchestration platform is configured to receive the predetermined network configuration information via the at least one communication interface, the predetermined network configuration information having been generated by an administrator for the enterprise computer network after compiling configuration information for the enterprise computer network and at least one protected network asset of the enterprise computer network, the predetermined network configuration information having been generated using a configuration information template;

wherein the disaster recovery orchestration platform is configured to store the predetermined network configuration information in the storage device.

23. A non-transitory computer-readable medium storing program instructions that, when executed by at least one platform computing device or at least one processor, cause a computer-controlled orchestration platform to perform a method facilitating business continuity of an enterprise computer network, the method comprising:

receiving an initiate network recovery message at a disaster recovery orchestration platform identifying an enterprise computer network to be recovered;

retrieving predetermined network configuration information associated with the enterprise computer network from a storage device accessible to the disaster recovery orchestration platform; and building a virtual recovered enterprise network in a virtual computing environment based at least in part on the predetermined network configuration information;

receiving an initiate protected asset restoration message at the disaster recovery orchestration platform identifying a protected network asset associated with the enterprise computer network to be restored to the virtual recovered enterprise network;

extracting predetermined asset configuration information associated with the protected network asset from the predetermined network configuration information, wherein the predetermined asset configuration information includes asset interface information, asset operating parameters, variable parameter values, and fixed parameter values;

retrieving a backup version of the protected network asset from an enterprise network backup repository associated with the enterprise computer network; and building a virtual machine representative of the protected network asset in the virtual recovered enterprise network based at least in part on the predetermined asset configuration information and the backup version of the protected network asset.

* * * * *